(12) United States Patent
Miyazaki

(10) Patent No.: US 11,402,471 B2
(45) Date of Patent: Aug. 2, 2022

(54) TOF RANGE FINDER

(71) Applicant: STANLEY ELECTRIC CO., LTD., Tokyo (JP)

(72) Inventor: Tetsuo Miyazaki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 609 days.

(21) Appl. No.: 16/408,300

(22) Filed: May 9, 2019

(65) Prior Publication Data
US 2019/0361123 A1 Nov. 28, 2019

(30) Foreign Application Priority Data
May 22, 2018 (JP) .............................. JP2018-097796

(51) Int. Cl.
| | | |
|---|---|---|
| G01C 3/00 | (2006.01) | |
| G01S 7/48 | (2006.01) | |
| G01S 7/4911 | (2020.01) | |
| G01S 17/36 | (2006.01) | |
| G01S 17/894 | (2020.01) | |

(52) U.S. Cl.
CPC ........... *G01S 7/4808* (2013.01); *G01S 7/4911* (2013.01); *G01S 17/36* (2013.01); *G01S 17/894* (2020.01)

(58) Field of Classification Search
CPC .... G01S 7/4808; G01S 7/4911; G01S 17/894; G01S 17/89; G01S 17/36
See application file for complete search history.

(56) References Cited

U.S. PATENT DOCUMENTS

| | | |
|---|---|---|
| 9,900,581 B2 | 2/2018 | Gruenwald |
| 10,101,452 B2 | 10/2018 | Ikeno et al. |
| 2017/0115393 A1* | 4/2017 | Nagai .................... G01S 7/4868 |
| 2017/0242124 A1* | 8/2017 | Nagai ...................... G01S 17/36 |
| 2017/0276789 A1 | 9/2017 | Ikeno et al. |
| 2019/0056482 A1 | 2/2019 | Nagai et al. |

FOREIGN PATENT DOCUMENTS

| | | | |
|---|---|---|---|
| DE | 102016106511 A1 | 10/2016 | |
| JP | 2003177077 A * | 6/2003 | ............ H04B 10/08 |
| JP | 2017173158 A | 9/2017 | |
| WO | 2017138033 A1 | 8/2017 | |

OTHER PUBLICATIONS

Extended European Search Report (EESR) dated Oct. 25, 2019 issued in corresponding European patent application No. 19174773.2.

* cited by examiner

*Primary Examiner* — Mark Hellner
(74) *Attorney, Agent, or Firm* — Holtz, Holtz & Volek PC

(57) ABSTRACT

The present invention provides a TOF range finder. A TOF range finder 1 includes a light source 2, which emits modulated emitting light La, a light source control unit 51, which drives the light source 2, an image sensor 10, which detects modulated reflected light, and a distance calculating unit 53, which calculates the distance to a distance measurement object 7 based on the phase difference between emitting light La and reflected light. The modulated light is generated in the form of a periodic waveform which contains an only odd multiple wave frequency component and at least one even multiple wave frequency component.

7 Claims, 19 Drawing Sheets

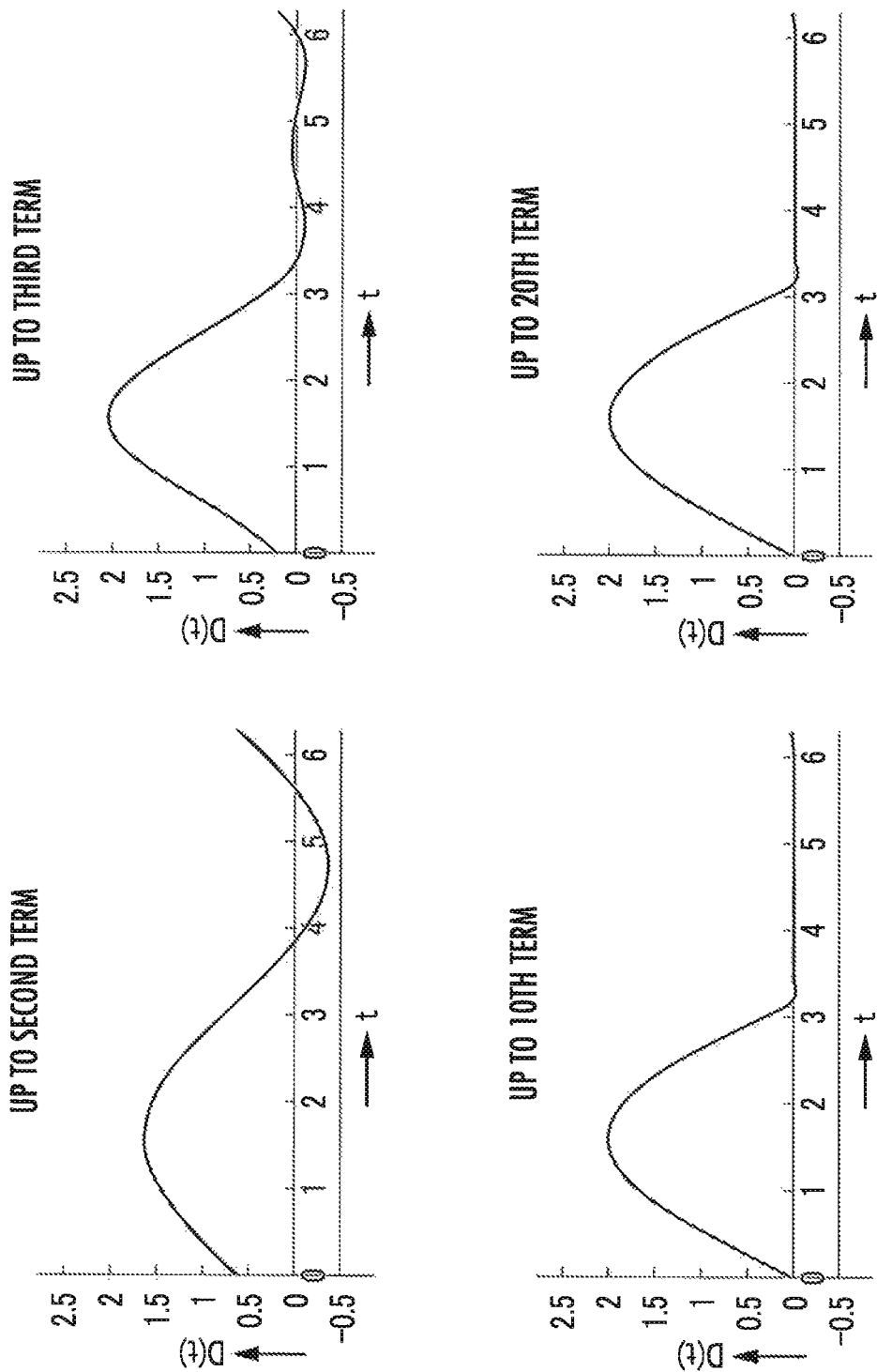

TOF RANGE FINDER

BACKGROUND OF THE INVENTION

1. Field of the Invention

The present invention relates to a TOF range finder adapted to perform distance measurement using a TOF (Time of Flight: light time of flight) method.

2. Description of the Related Art

The TOF method in a range finder comes in a direct type and an indirect type. In the indirect TOF method, modulated light of a predetermined frequency is emitted from a light source toward a predetermined imaging range, and the incident intensity of the reflected light that returns, being reflected off a distance measurement object, is detected for each pixel by a solid-state imaging device. Then, the phase difference between the emitted modulated light and the reflected modulated light is detected based on the quantity of charges stored in an image sensor. Subsequently, based on the detected phase difference, the distance to the distance measurement object is calculated for each pixel (e.g., Japanese Patent Application Laid-Open No. 2017-173158).

A phase difference can be detected by, for example, acquiring four pieces of information on phases that are shifted by ¼ (90 degrees in phase) of the period of emitting light and by using an expression of arc tangent ($=\tan^{-1}$) thereby to derive the phase difference (phase delay). The four pieces of phase information can be determined by integrating the charges stored in the image sensor at timings that are shifted by ¼ (90 degrees in phase).

If the four pieces of phase information are denoted by S0, S90, S180 and S270, then a phase delay $\phi$ can be calculated as a phase difference $\Delta\phi$ in expression (1.2) to be described in detail in a paragraph of an embodiment of the present invention, which will be discussed later. Further, in the four pieces of phase information, incident intensity I, which contributes to the calculation of the phase delay, can be calculated according to expression (1.6) to be described in detail also in the embodiment of the present invention, which will be discussed later. The incident intensity I denotes the component quantity of the light which is a part of the light that has entered the image sensor and which comes from the emitting light that has been reflected off an object to be imaged and returned. Hereinafter, when the incident intensity I is referred to simply as incident intensity, the incident intensity refers to a value calculated by expression (1.6).

The TOF range finder described in Japanese Patent Application Laid-Open No. 2017-173158 converts the modulated light from a light source toward an imaging range into rectangular pulses having a half-period pulse width.

SUMMARY OF THE INVENTION

The present inventors have analyzed the waveforms of the intensities of the emitting light from the light source of a TOF range finder, and found the intensity waveform of the emitting light which makes it possible to secure the high incident intensity of reflected light by less emission power and to maintain a linear relationship between a phase delay $\phi$ calculated by expression (1.2) and the distance to an object to be imaged.

An object of the present invention is to provide a TOF range finder which secures the high incident intensity of reflected light by less emission power and which has an improved linear relationship between the phase delay of reflected light with respect to emitting light and the distance to an object to be imaged.

A TOF range finder in accordance with the present invention includes:

a light source which emits modulated light toward a distance measurement object in a predetermined imaging range, the modulated light having intensity that exhibits a periodic waveform that contains a fundamental wave or an odd multiple wave for only one frequency component, and contains an even multiple wave for at least one frequency component;

an image sensor which has a plurality of pixels to detect, for each pixel, the incident intensity of incident light coming from the imaging range;

a phase difference detecting unit which detects the phase difference between emitting modulated light from the light source and reflected modulated light, which is reflected off a distance measurement object in the imaging range of the image sensor and which enters a pixel of the image sensor, based on the quantity of charges stored in the image sensor; and a distance calculating unit which calculates the distance to the distance measurement object based on the phase difference detected for each pixel by the phase difference detecting unit.

According to the present invention, the modulated light of a periodic waveform contains an odd multiple wave for only one frequency component. This makes it possible to improve the linear relationship between the phase delay of reflected light with respect to emitting light and the distance to an object to be imaged. Further, according to the present invention, the modulated light of a periodic waveform contains an even multiple wave for at least one frequency component. This enables the modulated light of the periodic waveform to be closer to a half-wave rectified wave, so that reflected light having high incident intensity can be obtained by less emission power.

Another TOF range finder in accordance with the present invention includes:

a light source which emits modulated light toward a distance measurement object in a predetermined imaging range, the modulated light having intensity which exhibits a periodic waveform based on a half-wave rectified waveform;

an image sensor which has a plurality of pixels to detect, for each pixel, the incident intensity of incident light coming from the imaging range;

a phase difference detecting unit which detects the phase difference between emitting modulated light from the light source and reflected modulated light, which is reflected off a distance measurement object in the imaging range of the image sensor and which enters a pixel of the image sensor, based on the quantity of charges stored in the image sensor; and a distance calculating unit which calculates the distance to the distance measurement object based on the phase difference detected for each pixel by the phase difference detecting unit.

According to the present invention, the modulated light of the periodic waveform is formed to have the periodic waveform based on the half-wave rectified waveform, thus making it possible to improve the linear relationship between the phase delay of reflected light with respect to emitting light and the distance to an object to be imaged while simultaneously securing high incident intensity of reflected light by less emission power. Further, various types of modulated light can be generated on condition that the modulated light of the periodic waveform is based on a half-wave rectified waveform.

Still another TOF range finder in accordance with the present invention includes:

a light source which emits modulated light toward a distance measurement object in a predetermined imaging range, the modulated light having intensity which exhibits a periodic waveform;

an image sensor which has a plurality of pixels to detect, for each pixel, the incident intensity of incident light coming from the imaging range;

a phase difference detecting unit which detects the phase difference between emitting modulated light from the light source and reflected modulated light, which is reflected off a distance measurement object in the imaging range of the image sensor and which enters a pixel of the image sensor, based on the quantity of charges stored in the image sensor; and a distance calculating unit which calculates the distance to the distance measurement object based on the phase difference detected for each pixel by the phase difference detecting unit, wherein the periodic waveform contains a fundamental wave and at least one even multiple wave which is larger than ⅓ but smaller than 1, as compared with the magnitude of the fundamental wave.

According to the present invention, the modulated light of the periodic waveform contains the fundamental wave and at least one even multiple wave which is larger than ⅓ but smaller than 1, as compared with the magnitude (amplitude) of the fundamental wave. The fundamental wave improves the linearity observed when the phase delay of reflected light with respect to emitting light changes with the distance to an object to be imaged. At least one even multiple wave which is larger than ⅓ but smaller than 1, as compared with the magnitude of the fundamental wave brings a periodic waveform closer to the half-wave rectified waveform, thus making it possible to increase the incident intensity of reflected light by less emission power and to change the intensity of modulated light according to a usage environment.

Preferably, in the TOF range finder according to the present invention, the periodic waveform contains at least one odd multiple wave which is smaller than ⅓, as compared with the magnitude of the fundamental wave.

According to the arrangement, the periodic waveform contains at least one odd multiple wave which is smaller than ⅓, as compared with the magnitude of the fundamental wave. The odd multiple wave that is smaller than ⅓, as compared with the magnitude of the fundamental wave means an odd multiple wave of fifth-order or more. Even if an odd multiple wave of fifth-order or more is contained in a periodic waveform, the fundamental wave will be hardly influenced. Therefore, although reflected light will slightly deviate from an ideal half-wave rectified waveform, the reflected light will have a waveform that is close to the ideal half-wave rectified waveform. Thus, the waveform of modulated light can be changed according to a usage environment while simultaneously improving the linear relationship.

Preferably, in the TOF range finder according to the present invention, the light source is an LED or laser light source.

According to the configuration, an LED or laser light source is used as the light source. The half-wave rectified waveform itself contains the points of a tangent that discontinuously changes, thus making it difficult to cause the emitting light from a light source to have the half-wave rectified waveform. However, directly supplying a control signal (current), which includes the points of a tangent that discontinuously changes, to an actually existing light source cannot cause a change in the luminance of the emitting light of the actually existing light source to have the discontinuous tangent change. Hence, supplying the current of the half-wave rectified wave directly to an LED or laser light source makes it possible to output modulated light that is extremely close to the ideal half-wave rectified wave from the light source.

Preferably, in the TOF range finder according to the present invention, the periodic waveform is constituted by replacing a waveform part that includes the discontinuous tangent points in the half-wave rectified waveform by a waveform part in which the tangent continuously changes.

With this arrangement, the intensity of the emitting light of a light source can be smoothly changed.

Preferably, in the TOF range finder according to the present invention, the periodic waveform is a waveform corresponding to D (t) given below:

$$D(t) = \frac{A}{2}(\sqrt{2} + \sin(t) - \cos(t)) \quad \left(0 \le t < \frac{\pi}{4}\right) \quad \text{[Expression 1]}$$
$$= A\sin(t) \quad \left(\frac{\pi}{4} \le t < \frac{3\pi}{4}\right)$$
$$= \frac{A}{2}(\sqrt{2} + \sin(t) + \cos(t)) \quad \left(\frac{3\pi}{4} \le t < \pi\right)$$
$$= \frac{A}{2}(\sqrt{2} + \sin(t) + \cos(t)) \quad \left(\pi \le t < \frac{5\pi}{4}\right)$$
$$= 0 \quad \left(\frac{5\pi}{4} \le t < \frac{7\pi}{4}\right)$$
$$= \frac{A}{2}(\sqrt{2} + \sin(t) - \cos(t)) \quad \left(\frac{7\pi}{4} \le t < 2\pi\right)$$

where A denotes a constant and t denotes a phase angle in the above expression.

With this arrangement, the intensity waveform of emitting light can be controlled to the half-wave rectified waveform, which is a desired waveform, or a waveform that is approximate to the half-wave rectified waveform.

Preferably, in the TOF range finder according to the present invention, wherein the integration elements includes two integration elements which integrate a photodetector of each pixel, the two integration elements integrating the output of the photodetector during one half time and the other half time of the period of the periodic waveform respectively, and the phase difference detecting unit detects the phase difference based on the difference between the integration amounts of the two integration elements.

With this arrangement, the incident intensity can be increased to a high level.

In the TOF range finder according to the present invention, wherein the integration elements includes two integration elements which integrate a photodetector of each pixel, the two integration elements integrating the output of the photodetector during one half time and the other half time of the period of the periodic waveform respectively, and the phase difference detecting unit detects the phase difference based on the difference between the integration amounts of the two integration elements.

With this arrangement, the influences of background light can be eliminated in the detection of a phase difference.

BRIEF DESCRIPTION OF THE DRAWINGS

Some of the features and benefits of the present invention having been stated, others will become apparent as the description proceeds when taken in conjunction with the accompanying drawings, in which:

FIG. 8 presents the timing charts of D (t), which is defined by expression (2.2), and an integral (S0) and so on;

FIG. 16 presents the graphs illustrating the half-wave rectified waveform defined by expression (5.1) has been subjected to Fourier series expansion to each term with A=1;

DESCRIPTION OF THE PREFERRED EMBODIMENTS

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
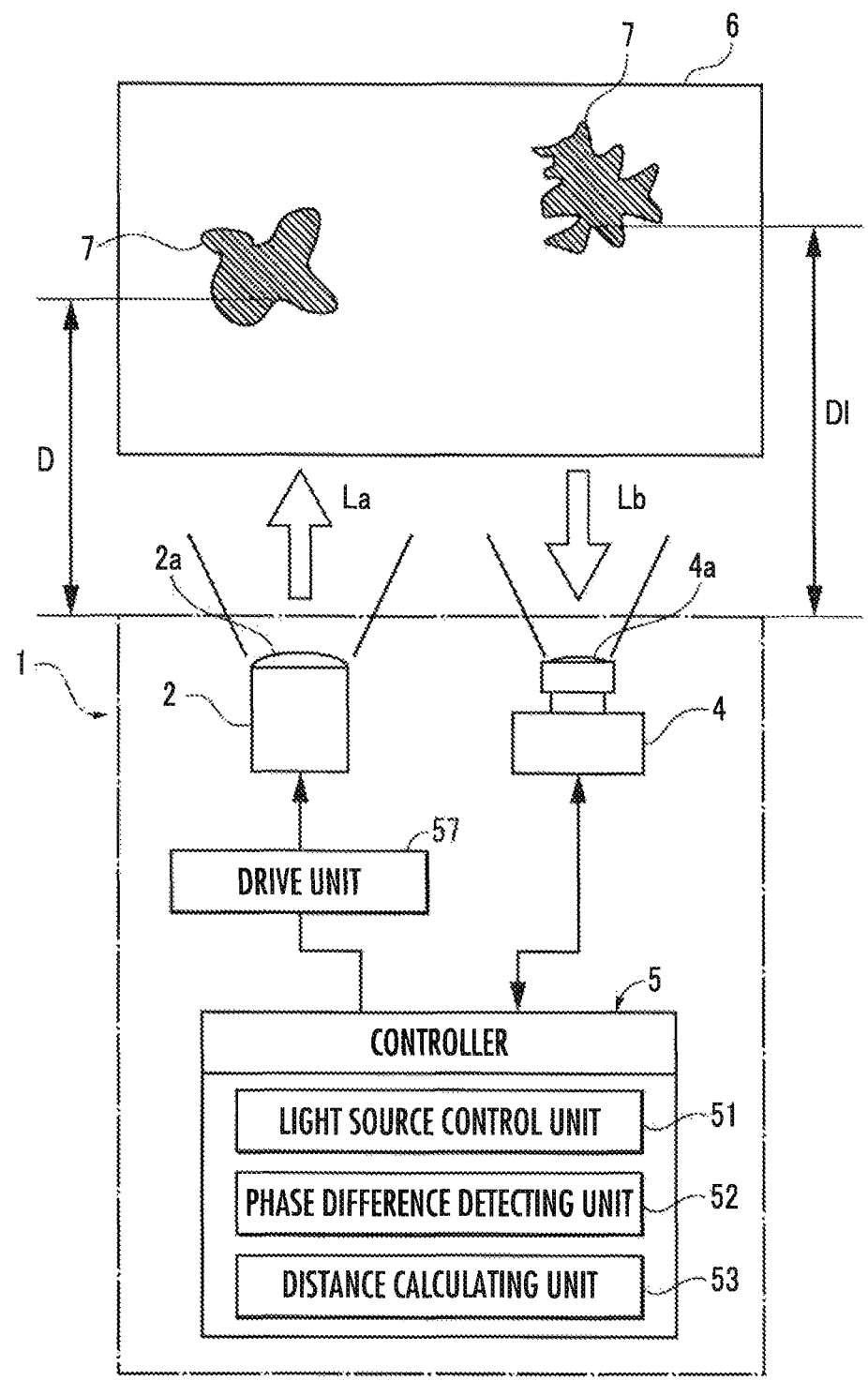
FIG. 1 is an overall configuration diagram of a TOF range finder.

FIG. 1 is an overall configuration diagram of a TOF range finder 1. The TOF range finder 1 includes a light source 2, a camera (image sensor) 4, and a controller 5. The light source 2 emits emitting light La (modulated light) toward an imaging range 6 in which a distance measurement object 7 exists. The imaging range 6 is the same range as the angle of view of the camera 4 and is set to include a predetermined range in which the distance measurement object 7 exists. The irradiation range of the emitting light La is set to be wider than the imaging range 6.

The imaging range 6 usually has one or more distance measurement objects 7, but has no distance measurement object 7 in some cases. The distance measurement object 7 is typically a moving body that moves within the imaging range 6, but is a stationary object in some cases. Considering that the distance measurement object 7 may be a person, the emitting light La typically uses infrared light to avoid influences on the person.

The controller 5 includes a light source control unit 51, a phase difference detecting unit 52, and a distance calculating unit 53. The light source control unit 51 outputs a drive control signal to a drive unit 57 to control the intensity (luminance) of the emitting light of the light source 2 through the drive unit 57. The phase difference detecting unit 52 detects a phase difference $\Delta\phi$ based on input data from the camera 4 (for more detail, refer to expression (1.2) and the like, which will be discussed later). The distance calculating unit 53 calculates a distance D1 to each distance measurement object 7 based on the phase difference $\Delta\phi$ detected by the phase difference detecting unit 52 (this will be described in detail later with reference to expression (1.4) and the like).

A lens 2a is attached to a light emitting section of the light source 2, and adjusts the light distribution of the emitting light La of the light source 2. The emitting light La irradiates the entire imaging range 6 at the same time. A lens 4a is attached to the incident section of the camera 4 to collect incident light Lb coming from the imaging range 6 and direct the collected incident light Lb as a captured image light into an image sensor 10 (FIG. 2) in the camera 4. The incident light Lb includes reflected light (reflected modulated light) of the emitting light La (emitting modulated light), which reflects off the distance measurement object 7 and returns, and background light. The reflected light enters a corresponding pixel G (FIG. 2) in the image sensor 10 according to the position of the distance measurement object 7, from which the reflected light is derived, in the imaging range 6. The modulation of the emitting light La makes it easy to extract the reflected modulated light as the reflected light of the emitting light La from the incident light Lb.

Figure 2:
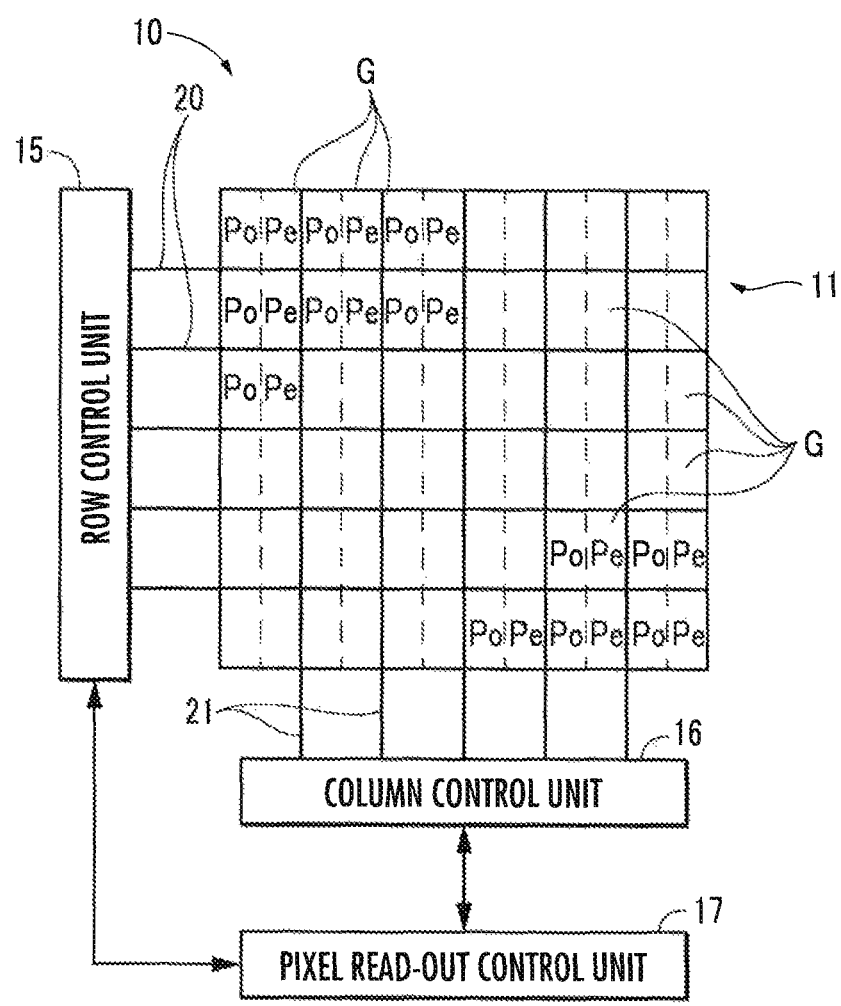
FIG. 2 is a configuration diagram of an image sensor provided in a camera.

FIG. 2 is a configuration diagram of the image sensor 10 provided in the camera 4. The image sensor 10 includes, as the major constituent elements, a pixel array 11, a row control unit 15, a column control unit 16, and a pixel read-out control unit 17. The image sensor 10 is a CMOS type, but may be other types of image sensors, such as a CCD.

The pixel array 11 in FIG. 2 is illustrated in a front view, and has a plurality of pixels G (n, m) distributed on a plane in a grid array and aligned in a column direction (vertical direction) and a row direction (horizontal direction).

In order to identify each pixel G in the pixel array 11, a row number n and a column number m are used to denote the pixel G (n, m). The pixel G (n, m) refers to the pixel G located on an n-th row from top and an m-th column from left in the front view of the pixel array 11. The pixel array 11 is composed of, for example, 126 (rows)×126 (columns) pixels G.

If there is no particular need for discriminating individual pixels, then the pixel G (n, m) will be generically referred to as "the pixel G." Each pixel G has two sub-pixels Po, Pe. If the sub-pixels Po (o: odd) and Pe (e: even) are not discriminated, then the sub-pixels will be generically referred to as "the sub-pixels P."

The row control unit 15 supplies control signals to a row control line 20 so as to enable the pixels G of the pixel array 11 to be controlled for each row. The column control unit 16 applies a control signal to a column control line 21 so as to enable the pixels G of the pixel array 11 to be controlled for each column. The pixel read-out control unit 17 controls the row control unit 15 and the column control unit 16 according to the control signals from the controller 5 (FIG. 1).

Figure 3:
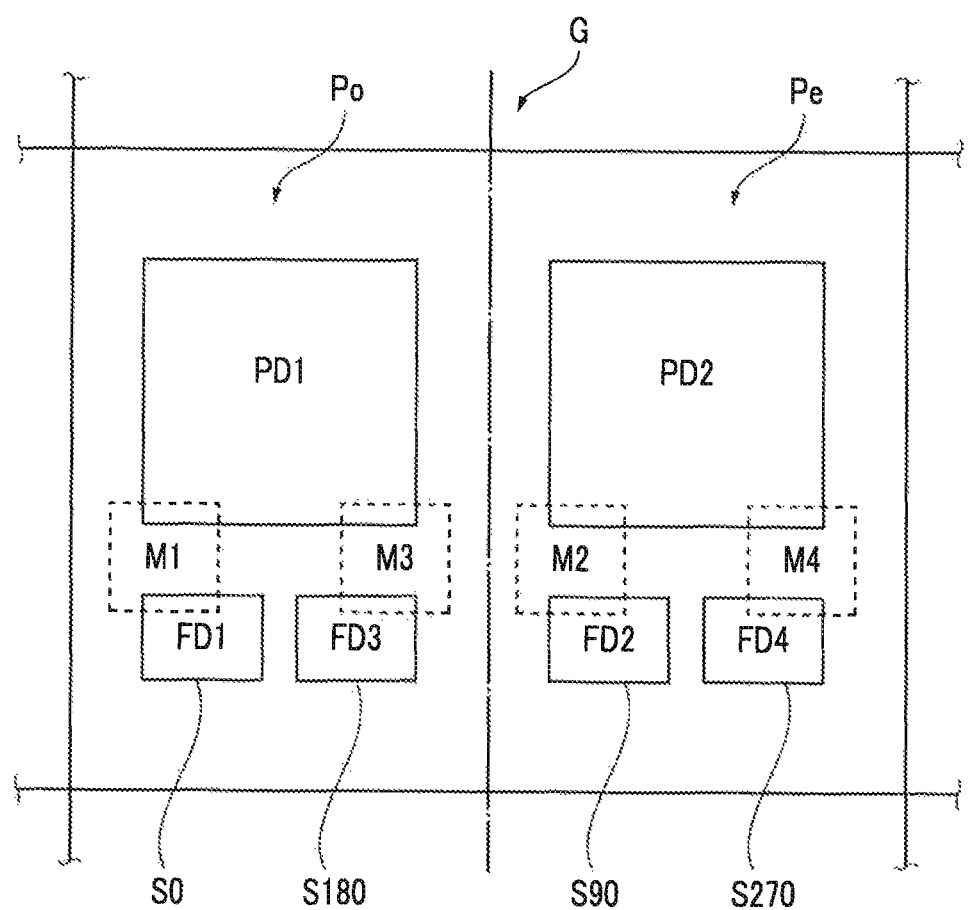
FIG. 3 is a detailed configuration diagram of a pixel.

FIG. 3 is a configuration diagram of the pixel G In the pixel G, the sub-pixel Po is placed on the left and the sub-pixel Pe is placed on the right in a front view. The sub-pixel Po includes PD1, M1, M3, Fd1 and Fd3. The sub-pixel Pe includes PD2, M2, M4, Fd2 and Fd4.

PD stands for photodiode (photodetector). M means a sorting switch, and Fd means a floating diffusion (integration element). M1 to M4 are composed of field effect transistors (FETs). However, the control signal lines of the FETs are omitted. When there is no need to individually discriminate Fd1 to Fd4, these floating diffusions will be generically referred to as "Fd."

The overall operations of the sub-pixel Po and the sub-pixel Pe are the same except for the operation timings of the gates (namely, M1 to M4) attached thereto. Hence, only the operation of the sub-pixel Po will be described.

The PD generates more electrons as the intensity of incident light entering the pixel G increases. As the number of electrons increases, the charge amount (absolute value) increases. The M1 and M3 are turned ON/OFF according to an applied voltage by a control signal line. In each ON/OFF cycle, the length of the ON period of M1 and the length of the ON period of M3 are the same. However, there is no period in which M1 and M3 are simultaneously turned ON. The period of the ON/OFF cycle is set to the period of the emitting light La, and the ON period is desirably set to a half period of the emitting light La (half the time of the period of the emitting light La).

The quantities of electrons stored in Fd1 to Fd4 during the ON periods of M1 to M4 correspond to S0, S90, S180 and S270 indicated in expression (1.2), the ON starting periods shifting by 90° in the incident phase of the incident light Lb. In other words, S0 to S270 denote the integration amounts of the incident intensities of the incident light Lb when the incident light Lb enters the sub-pixel Po or Pe during the ON periods of M1 to M4.

More specifically, in the ON period (the first half period) of M1, the electrons generated by PD1 of the sub-pixel Po are supplied to FD1 and stored as S0. In the ON period (the second half period) of M3, the electrons generated by PD1 of the sub-pixel Po are supplied to FD3 and stored as S180. In the same manner, in the ON period (the first half period) of M2, the electrons generated by PD2 of the sub-pixel Pe are supplied to FD2 and stored as S90. In the ON period (the second half period) of M4, the electrons generated by PD2 of the sub-pixel Pe are supplied to FD4 and stored as S270.

In the TOF range finder 1, the times and periods, such as the emission time of the emitting light La from the light source 2 and the incident time of the incident light Lb entering the pixel G of the image sensor 10 are defined by the phase of the periodic waveform of the emitting light La (one period corresponding to 360° or 2·π).

If each cycle (period) is set to 0° to 360°, then M1 is turned ON at a phase of 0° to 180° and turned OFF at a phase of 180° to 360° in each cycle. M3 has a reversed ON/OFF relationship with M1, and is therefore turned OFF at a phase of 0° to 180° and turned ON at a phase of 180° to 360°.

If each cycle (period) is set to 90° to 450°, then M2 is turned ON at a phase of 90° to 270° and turned OFF at a phase of 270° to 450° in each cycle. M4 has a reversed ON/OFF relationship with M2, and is therefore turned OFF at a phase of 90° to 270° and turned ON at a phase of 270° to 450°.

Figure 4:
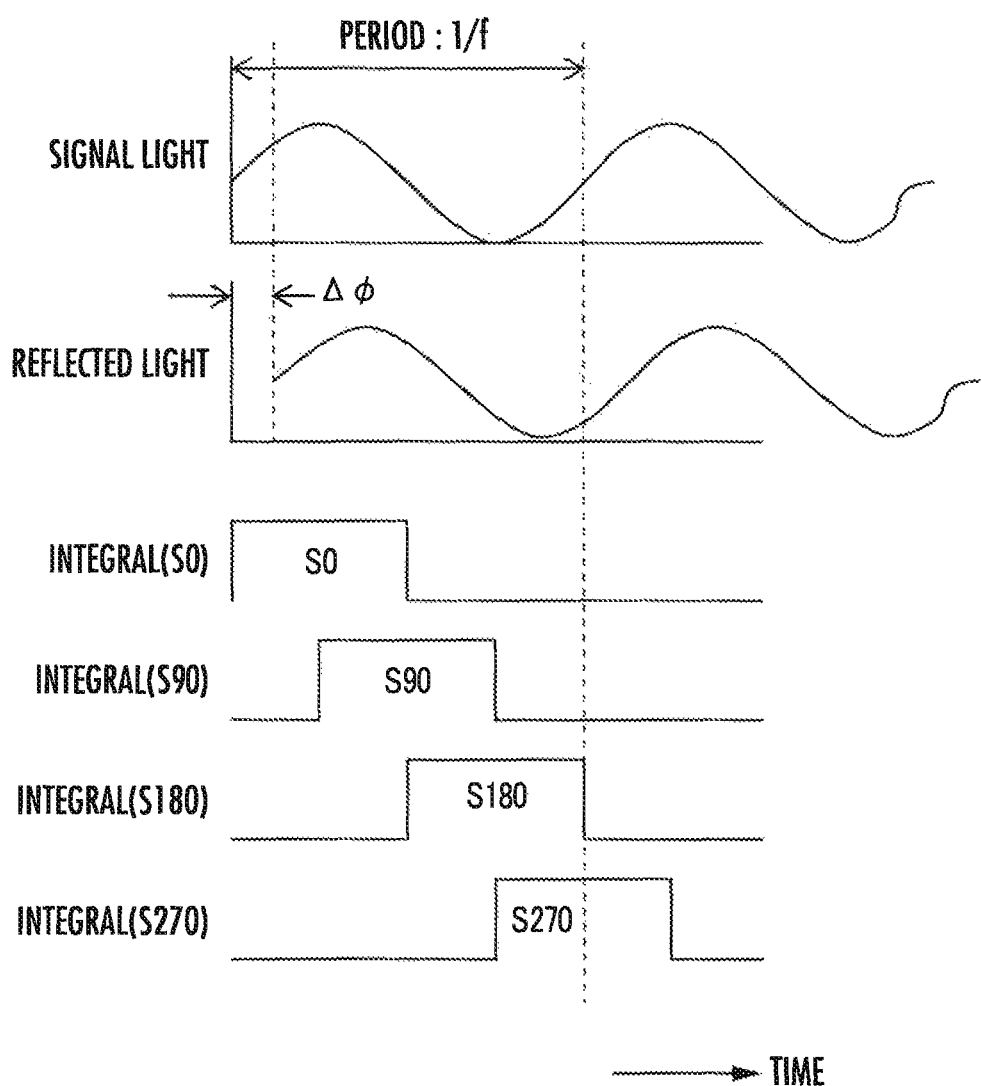
FIG. 4 presents timing charts related to the signals at each section of the TOF range finder.

FIG. 4 is a timing chart regarding the signals at each section of the TOF range finder 1. The emitting light La is the signal light in FIG. 4.

The following expressions will be defined.

$$S(\cos) = S0 - S180 \qquad (1.1a):$$

$$S(\sin) = S90 - S270 \qquad (1.1b):$$

$$\Delta\phi = \tan^{-1}\{S(\sin)/S(\cos)\} \qquad (1.2):$$

$$tc = (\Delta\phi/2\cdot\pi) \times (1/f) \qquad (1.3):$$

$$D1 = tc \times c \times (\tfrac{1}{2}) = \Delta\phi \cdot \{c/(4\cdot\pi\cdot f)\} \qquad (1.4):$$

where the definitions of the symbols are as shown below:

$\Delta\phi$: Phase difference when signal light at the time of emission hits the distance measurement object 7 and the reflected light enters the pixel G of the image sensor 10;

tc: Time required for signal light to return to the image sensor 10 after being emitted from the light source 2 and reflected off the distance measurement object 7;

f: Frequency of the periodic waveform of the intensity of the emitting light La;

c: Light speed;

D1: Distance from the TOF range finder 1 to the distance measurement object 7.

Further, the following expressions will be defined.

$$D1\max = \{c/(2\cdot\pi\cdot f)\} (\text{unit}:m) \quad (1.5)$$

$$I = \sqrt{\{(S(\sin))^2 + (S(\cos))^2\}} \quad (1.6)$$

where the definitions of the symbols are as shown below:

D1max: Maximum distance that can be measured by the TOF range finder 1; and

I: Incident intensity (luminance) of reflected light entering the image sensor 10.

The right side of (1.6) means that $\{(S(\sin))^2+(S(\cos))^2\}$ is in the $\sqrt{\ }$. Further, $I \geq 0$ is derived from (1.6). Therefore, I is indicated as |I| by adding a sign of an absolute value, as appropriate, in FIG. 5 and the like.

Figure 5:
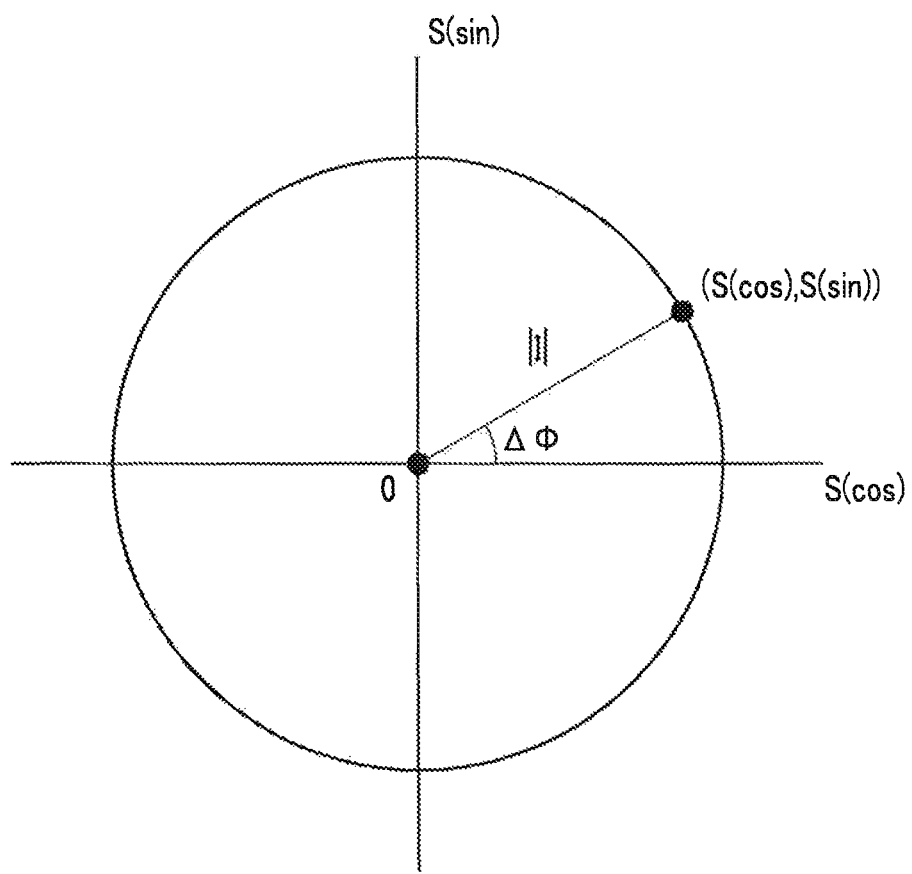
FIG. 5 is a graph illustrating the relationship between the phase difference (the difference between the phase of emitting light and the phase of reflected light) when the periodic waveform of reflected light is a sine wave, the amplitude of which is one, and the incident intensity (luminance) of reflected light entering the image sensor.

FIG. 5 is a graph illustrating the relationship between $\Delta\phi$ and the incident intensity |I| (luminance) of reflected light entering the image sensor 10 when the periodic waveform of the reflected light is a sine wave, the amplitude of which is 1. Referring to FIG. 5, the axis of abscissas and the axis of ordinates indicate S(cos) and S(sin), respectively. Hereinafter, the graph illustrating the relationship between $\Delta\phi$ and the incident intensity |I| (luminance) of the reflected light entering the image sensor 10, as in FIG. 5, will be referred to as "the reflected light luminance graph."

The following will discuss the reflected light. The study of the reflected light leads to the study of the emitting light La emitted by the light source 2. When the emitting light La from the light source 2 is reflected off the distance measurement object 7 and enters each pixel G of the image sensor 10, the reflected light attenuates according to the distance D1 between the TOF range finder 1 and the distance measurement object 7 because of the emission intensity of the emitting light La $\propto$ the incident intensity of the reflected light when the attenuation is ignored. Accordingly, if reflected light with high efficiency is found, then the emitting light La of the same periodic waveform as that of the found reflected light is desirably emitted by the light source 2.

Figure 6A:
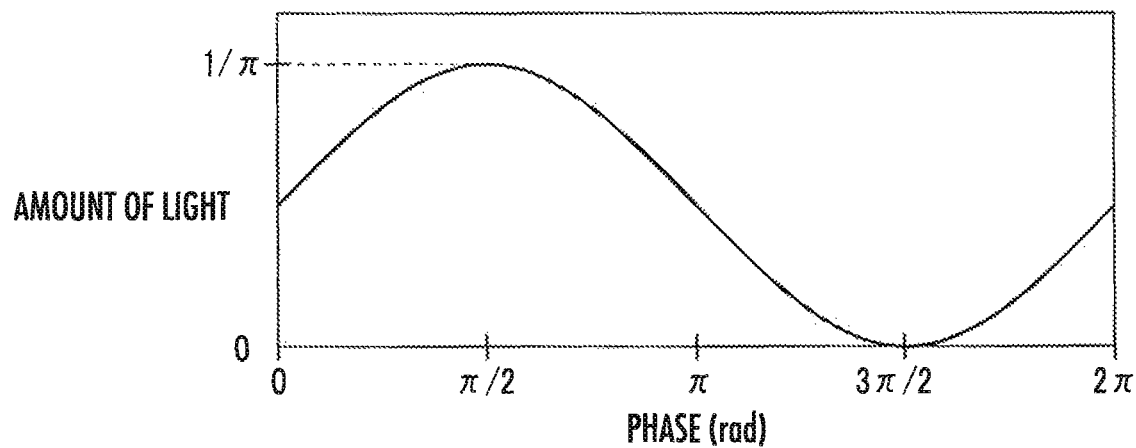
FIG. 6A is a graph of the reflected light of the sine wave, the period of which is $2 \cdot \pi$ and the integral of the light quantity per period of which is one.
Figure 6B:
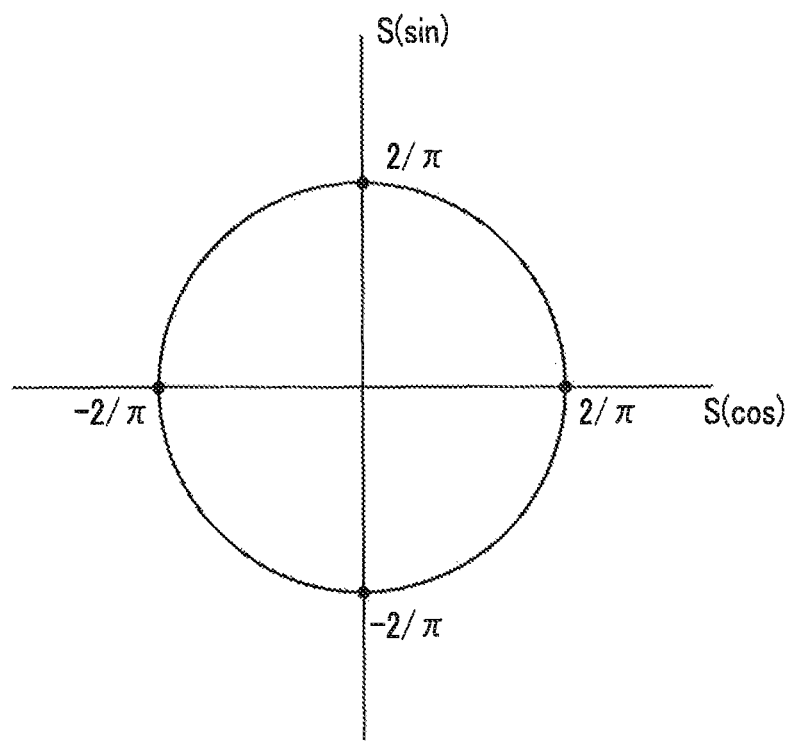
FIG. 6B is a luminance graph of the same reflected light as that in FIG. 6A.

FIG. 6A and FIG. 6B are related to the analysis obtained when the reflected light is a sine wave, the period of which is $2 \leq \pi$ and the integral of the light quantity per period of which is one. FIG. 6A is the waveform graph of the reflected light, and FIG. 6B is a reflected light luminance graph. The incident light Lb entering each pixel G of the image sensor 10 includes background light in addition to the reflected light of the emitting light La from the light source 2, reflected off the imaging range 6 and returned to the TOF range finder 1. However, regarding S0-S180, which indicates the difference between S0 and S180, and S90-S270, which indicates the difference between S90 and S270, only the reflected light is extracted from the incident light Lb and the background light is removed. Further, the phase difference detecting unit 52 of the controller 5 uses S0-S180 and S90-S270 rather than the incident light Lb itself to detect the phase difference $\Delta\phi$.

Hence, hereinafter, the incident light to be processed by the light source control unit 51 and the phase difference detecting unit 52 will be described as the reflected light obtained by removing the background light from the incident light Lb rather than using the incident light Lb itself.

The incident intensity |I| in the reflected light luminance graph of FIG. 6B maintains $2/\pi$ independently of $\Delta\phi$. The reflected light in FIG. 6A and FIG. 6B presents a problem in that the incident intensity |I| is low despite the emission power due to the generation of the emitting light La.

Figure 7A:
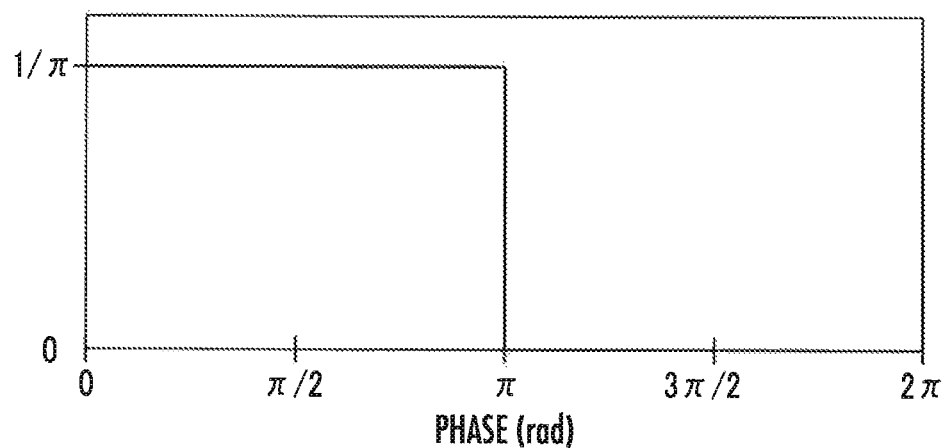
FIG. 7A is a graph of the reflected light having a square wave, the pulse width of which coincides with a first half period and the integral of the light quantity per period of which is one.
Figure 7B:
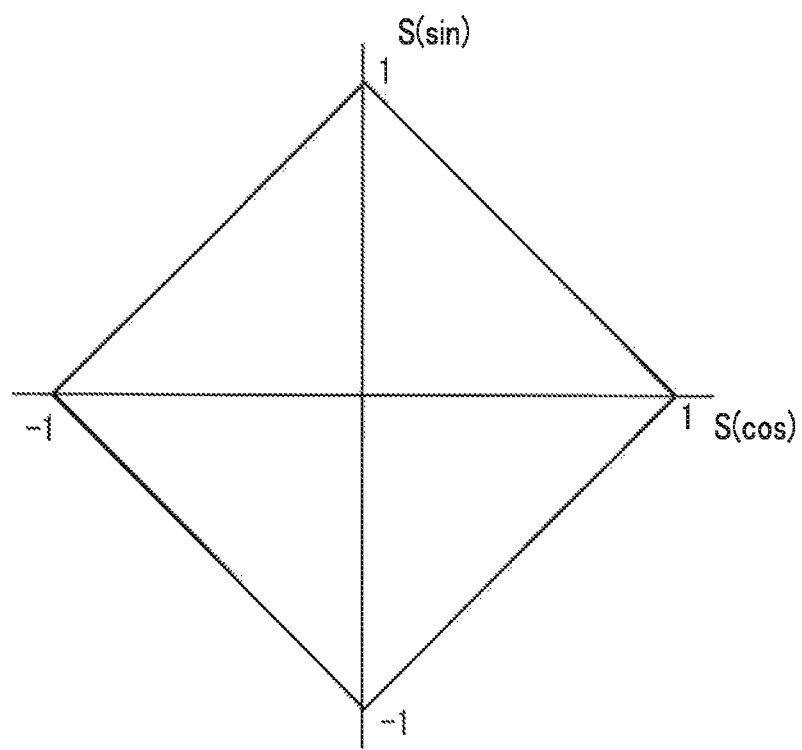
FIG. 7B is a luminance graph of the same reflected light as that in FIG. 7A.

FIG. 7A and FIG. 7B are related to the analysis obtained when the waveform of the reflected light is a square wave, the pulse width of which coincides with a first half period and the integral of the light quantity per period of which is one. FIG. 7A is the waveform graph of the reflected light and FIG. 7B is the reflected light luminance graph.

In the case of the reflected light of FIG. 7A, the incident intensity |I| in the reflected light luminance graph of FIG. 7B has a square shape having the four vertexes thereof lying on the axis of abscissas or the axis of ordinates. As a result, the relationship between $\tan^{-1}\{S(\sin)/S(\cos)\}$, which is the arc tangent of S(sin)/S(cos), and the phase difference $\Delta\phi$ becomes a nonlinear relationship rather than a linear relationship. Hence, the relationship cannot be expressed simply as $\Delta\phi = \tan^{-1}\{S(\sin)/S(\cos)\}$. Further, the reflected light of FIG. 7A and FIG. 7B poses a problem in that, although a sufficient incident intensity |I| is obtained at an integral multiple of $\Delta\phi=\pi/2$, the incident intensity |I| decreases at any other values of $\Delta\phi$. Hereinafter, the linearity will be defined as the property or accuracy of the linear relationship between the two, such as the linear relationship between $\tan^{-1}\{S(\sin)/S(\cos)\}$ and the phase difference $\Delta\phi$. Further, the improvement of linearity will mean that the relationship between the two comes closer to a linear relationship.

The maximum distance D1max that can be measured as the distance D1 to the imaging range 6 by the TOF range finder 1 is defined by the expression given below, applying $\Delta\phi=2\pi$ in (1.4) given above.

$$D1\max = 2\cdot\pi\times\{c/(4\cdot\pi\cdot f)\} \quad (2.0)$$

The periodic waveform D (t) of the emitting light La represented by the Fourier series expansion expression is given below.

$$D(t) = D0 + D1\cdot\sin(t) + D2\cdot\sin(2\cdot t) + D3\cdot\sin(3\cdot t) + \ldots + D1'\cdot\cos(t) + D2'\cdot\cos(2\cdot t) + D3'\cdot\cos(3\cdot t) + \quad (2.1)$$

where t denotes a phase angle as angular frequency $\omega \times$ time (i.e., $t = 2\cdot\pi \times$frequency f).

Figure 8:
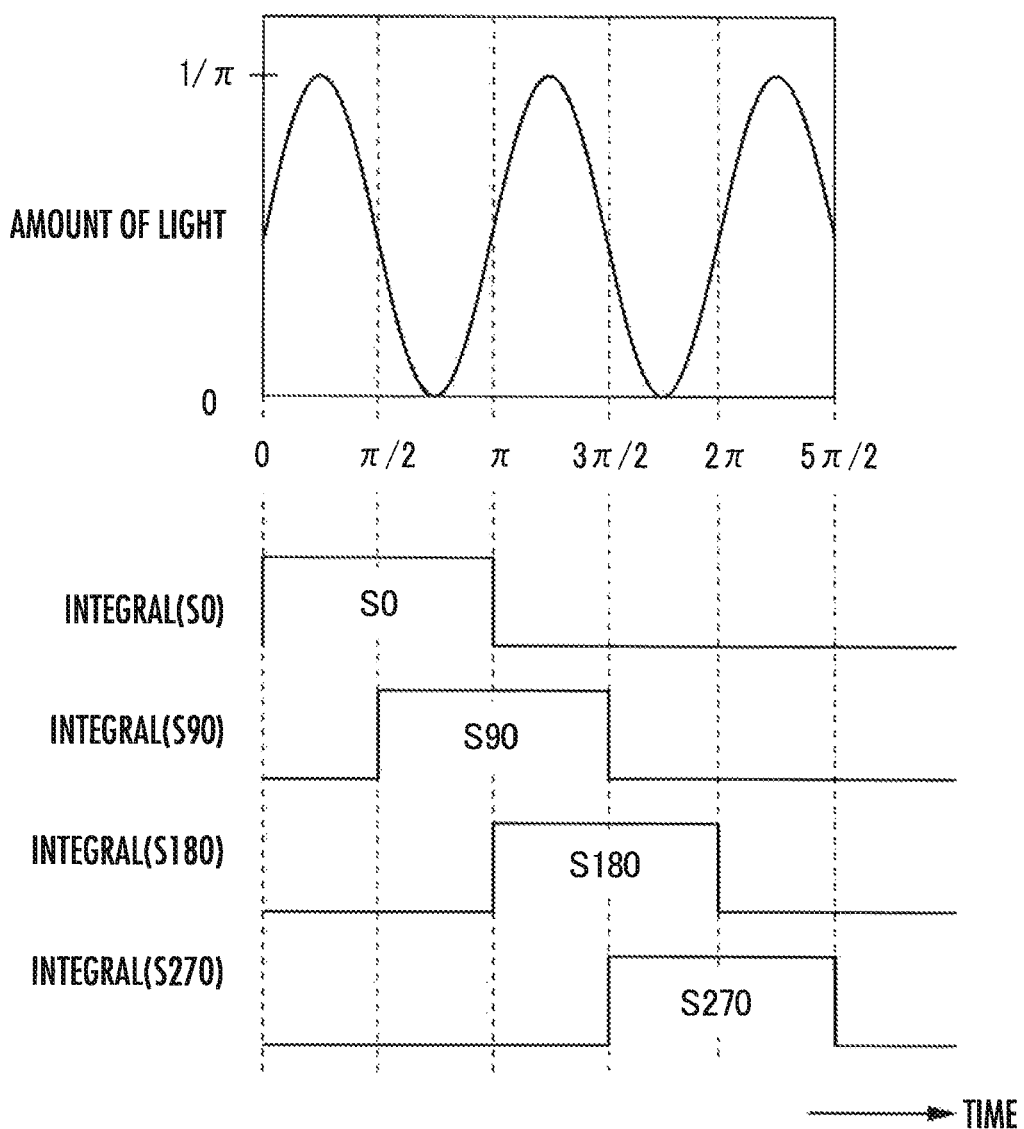

FIG. 8 is a timing chart of D (t) and integral (S0) and the like when D (t) is defined by the expression given below. The period of D (t) is 1/f.

$$D(t) = 1 + \{\sin(2\cdot t)/(2\cdot\pi)\} \quad (2.2)$$

From FIG. 8, it is understood that S0=S180 and S90=S270 hold. This always holds even if a phase delay takes place in D (t).

Figure 9:
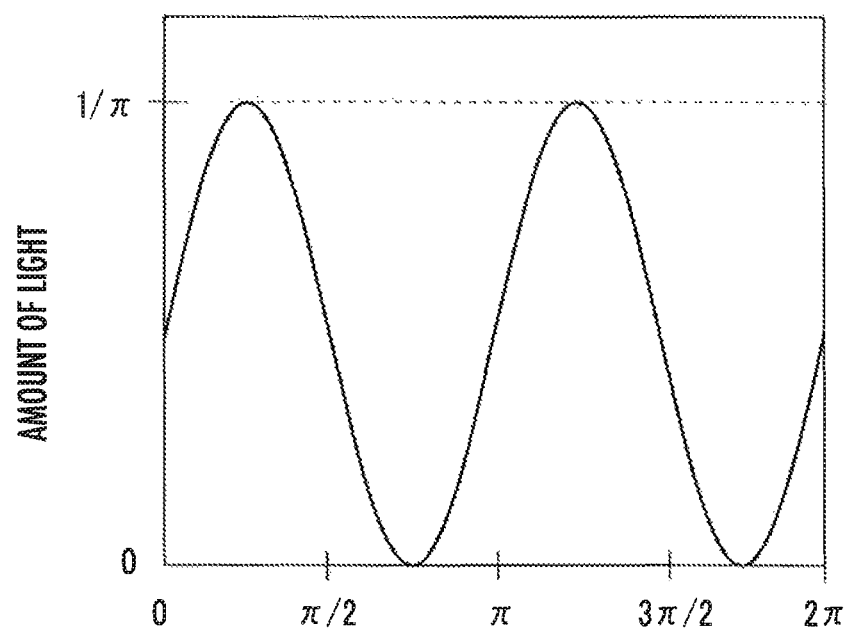
FIG. 9 is a waveform diagram of D (t) defined by expression (2.3)

FIG. 9 is a waveform diagram of D (t) defined by the expression given below.

$$D(t) = [1 + \{\sin(3\cdot t)\}]/(2\cdot\pi) \quad (2.3)$$

According to FIG. 9, although the periodic waveform of the emitting light La satisfies the foregoing expression (1.4), the period of $\Delta\phi$ inconveniently becomes $(2\cdot\pi)/3$. Therefore, D1max of expression (2.0) will be $\frac{1}{3}$ times, as compared with the fundamental wave, thus leading to the deterioration of the performance of the TOF range finder 1.

Figure 10A:
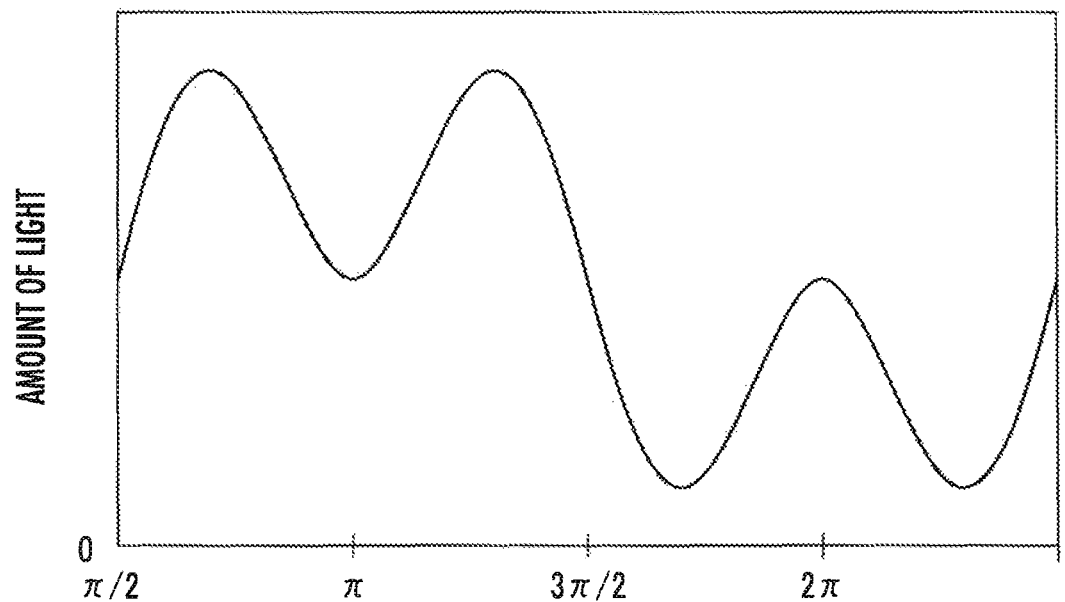
FIG. 10A is a periodic waveform of D (t) defined by expression (2.4)
Figure 10B:
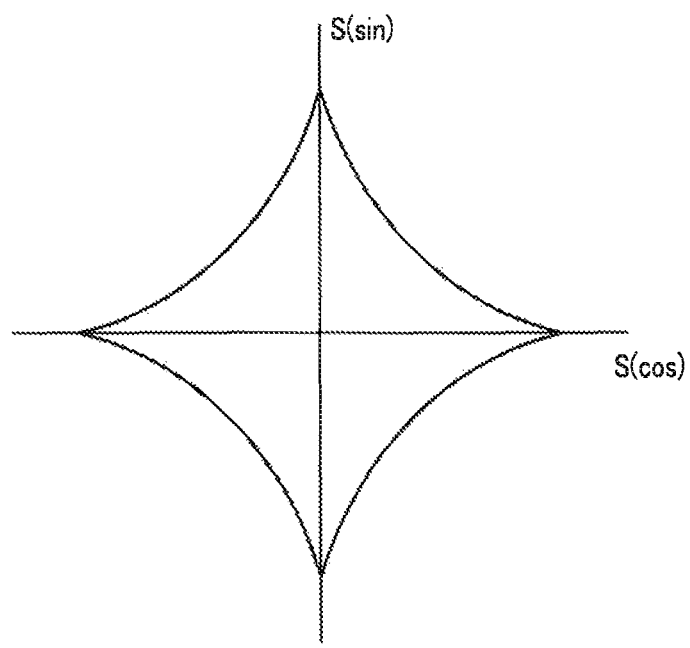
FIG. 10B is a graph of the reflected light luminance regarding the same D (t) as that in FIG. 10A.

FIG. 10A and FIG. 10B relate to D (t) defined by the expression given below. FIG. 10A is a diagram illustrating the periodic waveform of the reflected light, and FIG. 10B is a reflected light luminance graph.

$$D(t) = 2 + \sin(t) + \sin(3\cdot t) \quad (2.4)$$

From FIG. 10A and FIG. 10B, it is understood that the foregoing expression (1.2) is not satisfied.

Studying FIG. 9A to FIG. 10B reveals the following. The $\Delta\phi$ can be correctly calculated only if D (t) contains only one fundamental wave or one odd multiple wave. This is because the relationships of S0=S180 and S90=S270 hold regardless of repeated addition of even multiple waves, so that only odd multiple waves influence the calculation of $\Delta\phi$. The odd multiple wave or the even multiple wave in this case refers to a wave having a frequency that is an odd multiple (three times, five times, seven times . . . ) or an even multiple (twice, four times, six times . . . ) when the fundamental wave has the drive frequency (ON/OFF cycle) of a gate installed. There are a plurality of both odd multiple waves and even multiple waves as the higher harmonics of the frequency components of odd multiple frequencies and even multiple frequencies with respect to the fundamental wave. Containing only one odd multiple wave or even multiple wave frequency component means containing only one odd multiple wave or even multiple wave among the plurality of odd multiple waves or even multiple waves.

Figure 11:
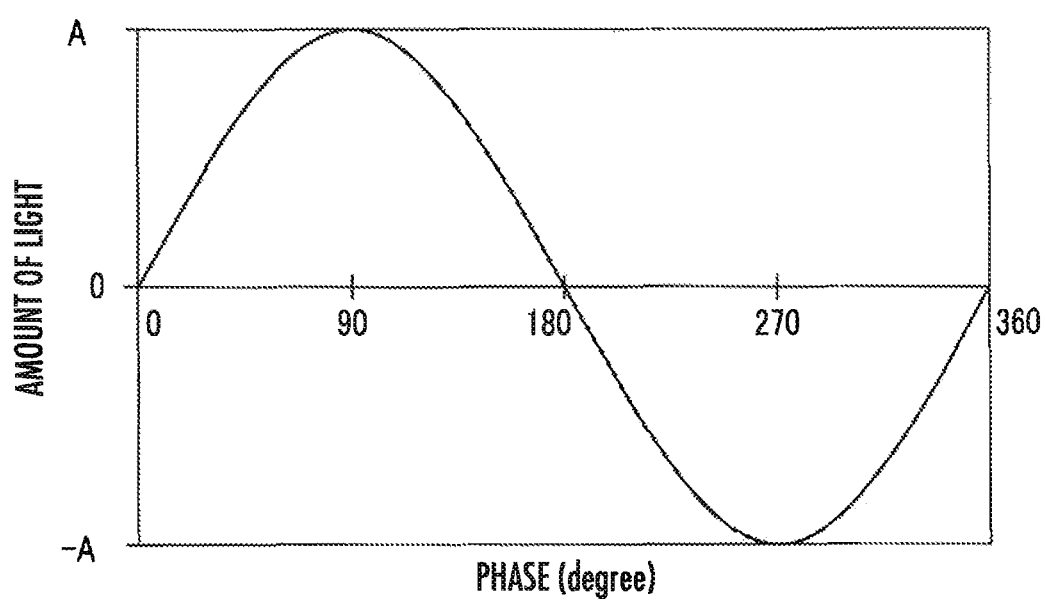
FIG. 11 is a periodic waveform graph of an emitting light La when D0=0, D1=A, and Dn=0 (provided that n is an integer larger than 1 (n>1)), and C (t) is added in expression (2.1)

FIG. 11 is the periodic waveform graph of the emitting light La when D0=0, D1=A, and Dn=0 (provided that n is an integer larger than 1 (n>1)) in the foregoing expression (2.1), and C (t) is added. "A" denotes a constant.

$$D(t)=A \cdot \sin(t)+C(t) \qquad (3.1):$$

$$C(t)=0 \qquad (3.2):$$

From FIG. 11, it is understood that the condition denoted by D (t)≥0 is not satisfied, so that C (t) other than C (t)≠0 is required to be added so as to satisfy the condition. Only an even multiple wave of sin (t) or cos (t) can be added as C (t) in order to satisfy the foregoing expression (1.2). Further, from the standpoint of energy efficiency (the power saving of the light source 2), the amplitude of an even multiple wave to be added is required to be as small as possible. Further, an odd multiple wave could be contained, although the foregoing expression (1.2) cannot be simply satisfied. In this case, from the standpoint of energy efficiency, an odd multiple wave is preferably smaller than ⅓, as compared with the magnitude of the fundamental wave and preferably contains at least one even multiple wave. This is because, when a square wave is subjected to the Fourier series expansion, a third-order odd multiple wave is ⅓ of the fundamental wave, and containing an odd multiple wave that is smaller than ⅓ of the fundamental wave (fifth-order or more) makes it possible to change the waveform of modulated light according to a usage environment and to improve the energy efficiency.

Figure 12A:
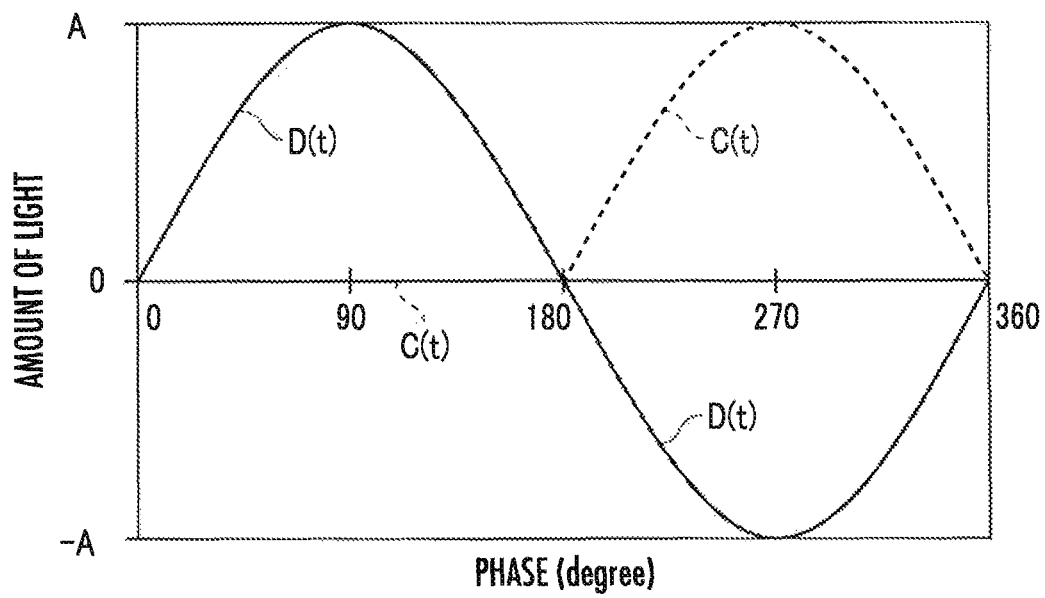
FIG. 12A is a diagram illustrating the comparison between D (t) and C1 (t) defined by expressions (3.3) and (3.4)
Figure 12B:
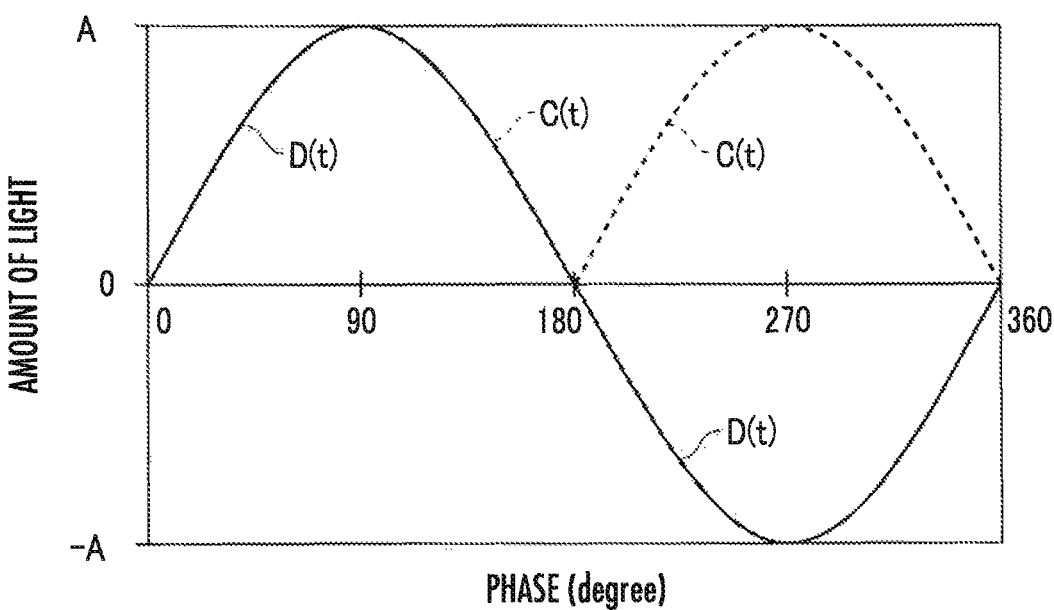
FIG. 12B is a chart illustrating a periodic waveform of D (t) observed when C2 (t) defined by expression (3.5) is adopted.

FIG. 12A and FIG. 12B relate to the waveform graphs given with D (t) in correlation with various values of C (t). In this case, C1 (t) and C2 (t) are examples of specific functions of C (t).

FIG. 12A illustrates D (t) in correlation with C1 (t) defined by expressions (3.3) and (3.4) given below. Referring to FIG. 12A, the solid line denotes D (t) and the dashed line denotes C1 (t).

$$C1(t)=0 \text{ where } 2 \cdot \pi \cdot n \leq t < \pi+2 \cdot \pi \cdot n \qquad (3.3):$$

$$C1(t)=|A \cdot \sin(t)| \text{ where } \pi+2 \cdot \pi \cdot n \leq t < 2 \cdot \pi \cdot (n+1) \qquad (3.4):$$

FIG. 12B is a periodic waveform graph of D (t) observed when C2 (t) defined by expression (3.5) given below is adopted. Referring to FIG. 12B, the solid line denotes D (t) and the dashed line denotes C2 (t).

$$C2(t)=|A \cdot \sin(t)| \text{ where } 2 \cdot \pi \cdot n \leq t < 2 \cdot \pi \cdot (n+1) \qquad (3.5):$$

From FIG. 12, it is understood that C1 (t) of FIG. 12A contains odd multiple waves, because the period is not π. This, therefore, does not observe the constraints of the foregoing expression (1.2). C2 (t) of FIG. 12B contains only even multiple waves, minimizing the emission power of the light source 2. Further, D (t)+C2 (t) satisfies the positive value condition that the emission power of the light source 2 is zero or more, independently of t.

Based on the studies described above, the periodic waveform that exhibits highest power efficiency as the periodic waveform of the intensity of reflected light is defined by the expression given below.

$$D(t)=A \cdot \sin(t)+|A \cdot \sin(t)| \qquad (5.1):$$

Figure 13:
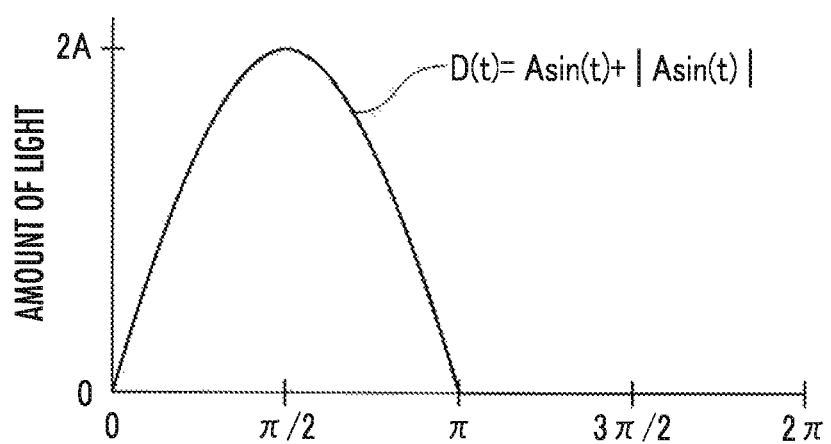
FIG. 13 is a chart illustrating the waveform of D (t) defined by expression (5.1)

FIG. 13 is the waveform graph of D (t) defined by expression (5.1).

Figure 14A:
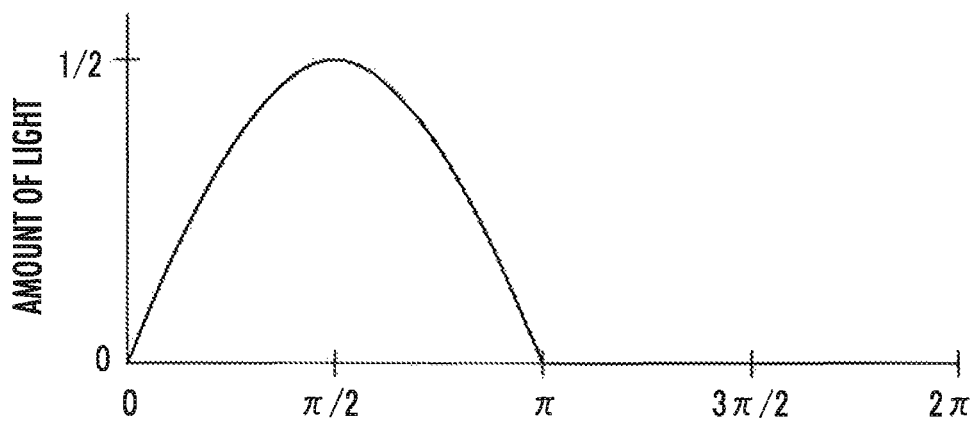
FIG. 14A is a graph of the reflected light of a half-wave rectified waveform, the integrated value of the light quantity per period thereof being one.
Figure 14B:
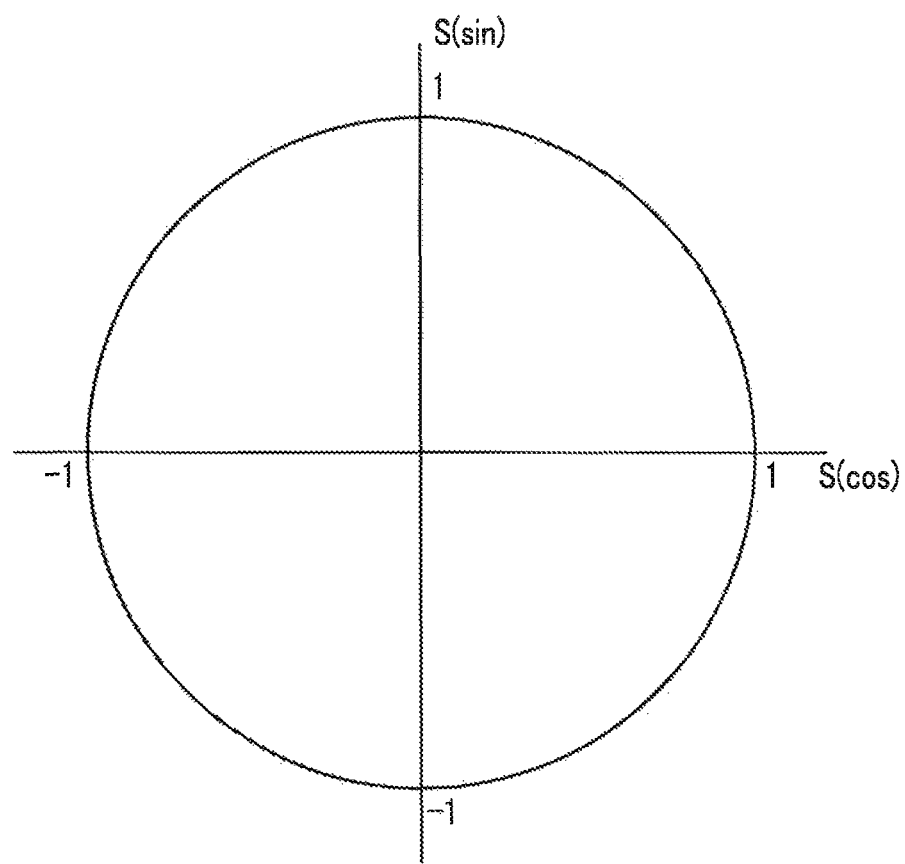
FIG. 14B is a graph of the luminance of the same reflected light as that in FIG. 14A.

FIG. 14A and FIG. 14B are related to D (t), the integrated value of the light quantity of reflected light per period of which is one. FIG. 14A is the graph of the reflected light, and FIG. 14B is a reflected light luminance graph.

Figure 15A:
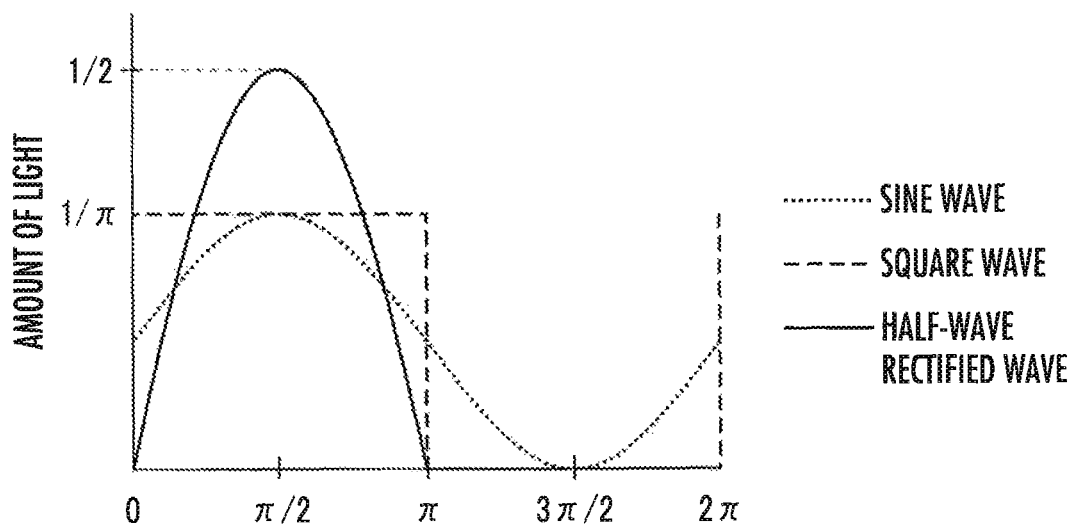
FIG. 15A is a chart illustrating the periodic waveforms of various types of D (t)
Figure 15B:
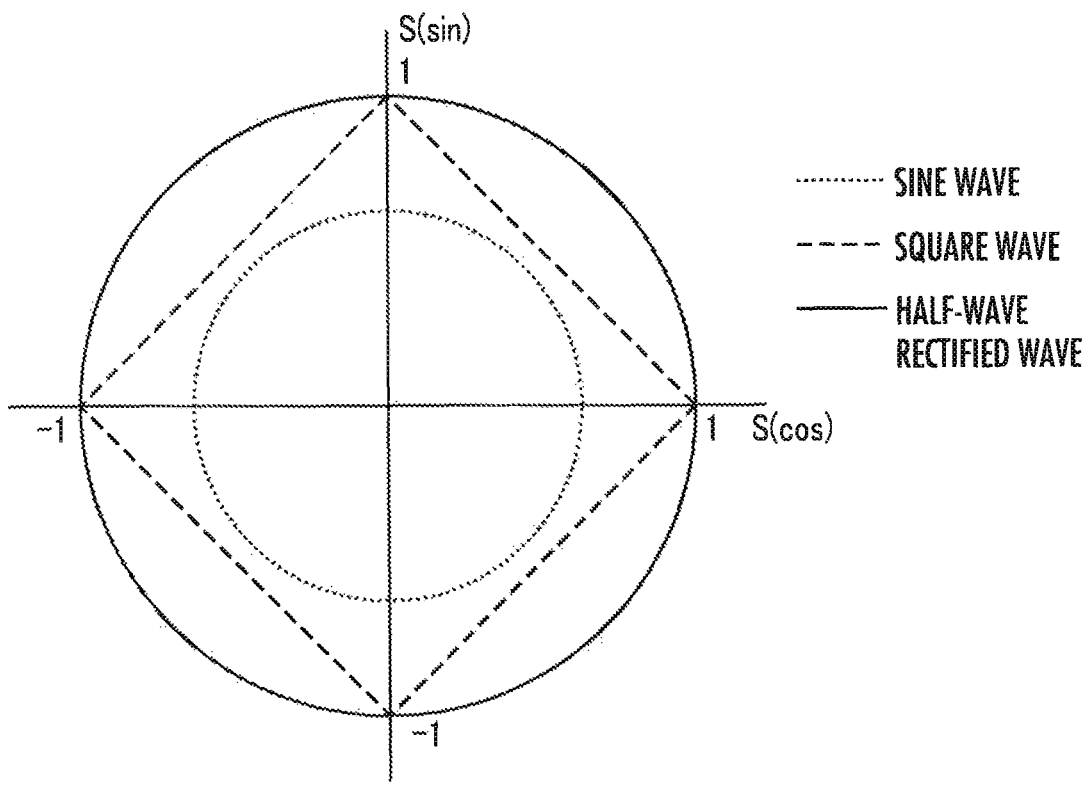
FIG. 15B is a graph of the reflected light luminance of each D (t) of FIG. 15A.

FIG. 15A and FIG. 15B are related to the comparison among various types of D (t). FIG. 15A is the periodic waveform graph of various types of D (t). FIG. 15B is the reflected light luminance graph of various types of D (t). In every D (t), the integral of the light quantity per period is one.

FIG. 15A and FIG. 15B illustrate three periodic waveforms, namely, a sine wave, a square wave, and a half-wave rectified wave, as the various types of D (t). According to the present invention, the "half-wave rectified waveform" refers to a periodic waveform which has a flat part (D (t)=0) for a predetermined period in a periodic function which contains a finite quantity of sinusoidal components.

The definitional equation of the sine wave in FIG. 15A and FIG. 15B is as given below.

$$D(t)=\{1+\sin(t)\}/(2 \cdot \pi) \qquad (5.2):$$

The definitional equations of the square wave in FIG. 15A and FIG. 15B are as given below.

$$D(t)=1/\pi \text{ where } 2 \cdot \pi \cdot n \leq t < \pi+2 \cdot \pi \cdot n \qquad (5.3):$$

$$D(t)=0 \text{ where } \pi+2 \cdot \pi \cdot n \leq t < 2 \cdot \pi \cdot (n+1) \qquad (5.4):$$

The definitional equations of the half-wave rectified wave of the sine wave in FIG. 15A and FIG. 15B are as given below.

$$D(t)=\sin(t)/2 \text{ where } 2 \cdot \pi \cdot n \leq t < \pi+2 \cdot \pi \cdot n \qquad (5.5):$$

$$D(t)=0 \text{ where } \pi+2 \cdot \pi \cdot n \leq t < 2 \cdot \pi \cdot (n+1) \qquad (5.6):$$

FIG. 15B is a graph of reflected light which has entered the pixel G. It can be said that the periodic waveform which makes it possible to secure high incident intensity of reflected light from less emission power and the periodic waveform which makes it possible to retain the linear relationship between $\tan^{-1}\{S(\sin)/S(\cos)\}$ and $\Delta\phi$ for both reflected light and emitting light La are the same. As a result, from FIG. 15B, it can be concluded that the half-wave rectified waveform is ideally adopted as the periodic waveform of the intensity of the emitting light La for the efficiency of the emission power and the linear relationship.

A supplementary description will be given with reference to FIG. 15B. FIG. 15B illustrates the efficiency of the emission power of the emitting light La and the linearity of the linear relationship between $\tan^{-1}\{S(\sin)/S(\cos)\}$ and $\Delta\phi$. The sine wave, the square wave, and the half-wave rectified wave, which are mutually compared, have the same integral of the light quantity per period, so that, the outer the wave is, the higher the luminance of the reflected light is. Thus, based on FIG. 15B, the efficiency of emission power increases in the order of the sine wave, the square wave, and the half-wave rectified wave.

Meanwhile, the relationship between $\tan^{-1}\{S(\sin)/S(\cos)\}$ and $\Delta\phi$ becomes linear when the characteristic line in FIG. 15B is expressed by a perfect circle. Hence, as the characteristic line becomes closer to a perfect circle, it means that the accuracy of linearity increases and the linearity is improved.

Therefore, it can be concluded that adopting the half-wave rectified wave is most ideal for the efficiency of emission power and the liner relationship, and for a waveform close to the half-wave rectified wave also, a high incident intensity of reflected light can be secured from less emission power, and the linearity of the linear relationship between the phase delay φ calculated according to expression (1.2) and the distance to an object to be imaged can be improved. A waveform close to the half-wave rectified wave has been studied as described below.

The half-wave rectified wave D (t) defined by the foregoing expression (5.1) has been subjected to the Fourier series expansion, as indicated below.

[Expression 2]

$$a_0 = \frac{1}{\pi}\int_0^\pi 2A\sin t\, dt \qquad (5.1.1)$$
$$= \frac{4A}{\pi}$$

$$a_n = \frac{1}{\pi}\int_0^\pi 2A\sin t\cos nt\, dt \qquad (5.1.2)$$
$$= \frac{2A}{\pi}\sin t\cos nt\, dt$$

When $n = 1$; (5.1.3)
$$a_n = \frac{2A}{\pi}\int_0^\pi \sin t\cos t\, dt = \frac{A}{\pi}\int_0^\pi \sin(2t)dt = \frac{-A}{\pi 2}[\cos(2t)]_0^\pi = 0$$

When $n \neq 1$; (5.1.4)
$$a_n = \frac{2A}{\pi}\int_0^\pi \sin t\cos nt\, dt =$$
$$\frac{A}{\pi}\int_0^\pi \sin(t+nt)+\sin(t-nt)dt = \frac{-A}{\pi(1+n)}[\cos(t+nt)]_0^\pi +$$
$$\frac{-A}{\pi(1-n)}[\cos(t-nt)]_0^\pi = \begin{cases} \frac{4A}{\pi(1+n)(1-n)} & (n = \text{even number}) \\ 0 & (n = \text{odd number}) \end{cases}$$

[Expression 3]

$$b_n = \frac{1}{\pi}\int_0^\pi 2A\sin t\sin nt\, dt \qquad (5.1.5)$$

When $n = 1$; (5.1.6)
$$b_n = \frac{2}{\pi}\int_0^\pi \sin t\sin t\, dt = \frac{A}{\pi}\int_0^\pi (1-\cos 2t)dt$$
$$= \frac{A}{\pi}[t]_0^\pi - \frac{A}{2\pi}[\sin 2t]_0^\pi$$
$$= A$$

When $n \neq 1$; (5.1.7)
$$b_n = \frac{2}{\pi}\int_0^\pi \sin t\sin nt\, dt = \frac{A}{\pi}\int_0^\pi \{\cos(t-nt)-\cos(t+nt)\}dt$$
$$= \frac{-A}{\pi(1-n)}[\sin(t-nt)]_0^\pi - \frac{A}{\pi(1+n)}[\cos(t+nt)]_0^\pi$$
$$= 0$$

When $n \neq 1$; (5.1.8)
$$D(t) = \frac{2A}{\pi} + A\sin t - \frac{4A}{3\pi}\cos 2t - \frac{4A}{15\pi}\cos 4t - \frac{4A}{35\pi}\cos 6t - \cdots$$

FIG. 16 is a graph illustrating the half-wave rectified wave which has been defined by the foregoing expression (5.1) and subjected to the Fourier series expansion to each term, with A=1. It is understood that the half-wave rectified wave approaches to an ideal half-wave rectified wave as the number of expansion terms increases like the second term, the third term, . . . , the tenth term, . . . , the twentieth term, and so on.

Further, the half-wave rectified wave is most ideal for the efficiency of emission power and the linear relationship, so that the periodic waveform is desirably brought as close to the half-wave rectified wave as possible. In this case, the periodic waveform preferably contains at least one even multiple wave that is larger than ⅓ but smaller than 1, as compared with the magnitude of the fundamental wave. This is because, when the half-wave rectified wave is subjected to the Fourier series expansion, the second-order even multiple wave will be 4/3·π of the fundamental wave, and if the periodic waveform contains at least one even multiple wave that is larger than ⅓ but smaller than 1, then the periodic waveform can be brought closer to the half-wave rectified wave.

Further, although the foregoing expression (1.2) will not be simply satisfied, an odd multiple wave can be contained. In this case, from the standpoint of energy efficiency, an odd multiple wave that is smaller than ⅓, as compared with the magnitude of the fundamental wave can be contained. This is because, it is understood that when the half-wave rectified wave is subjected to the Fourier series expansion, the third-order odd multiple wave will be zero and when a square wave is subjected to the Fourier series expansion, the third-order odd multiple wave will be ⅓ of the fundamental wave. In other words, an odd multiple wave that is smaller than ⅓, as compared with the magnitude of the fundamental wave, can be contained, and under this condition, the periodic waveform can be brought close to the half-wave rectified wave.

Figure 17:
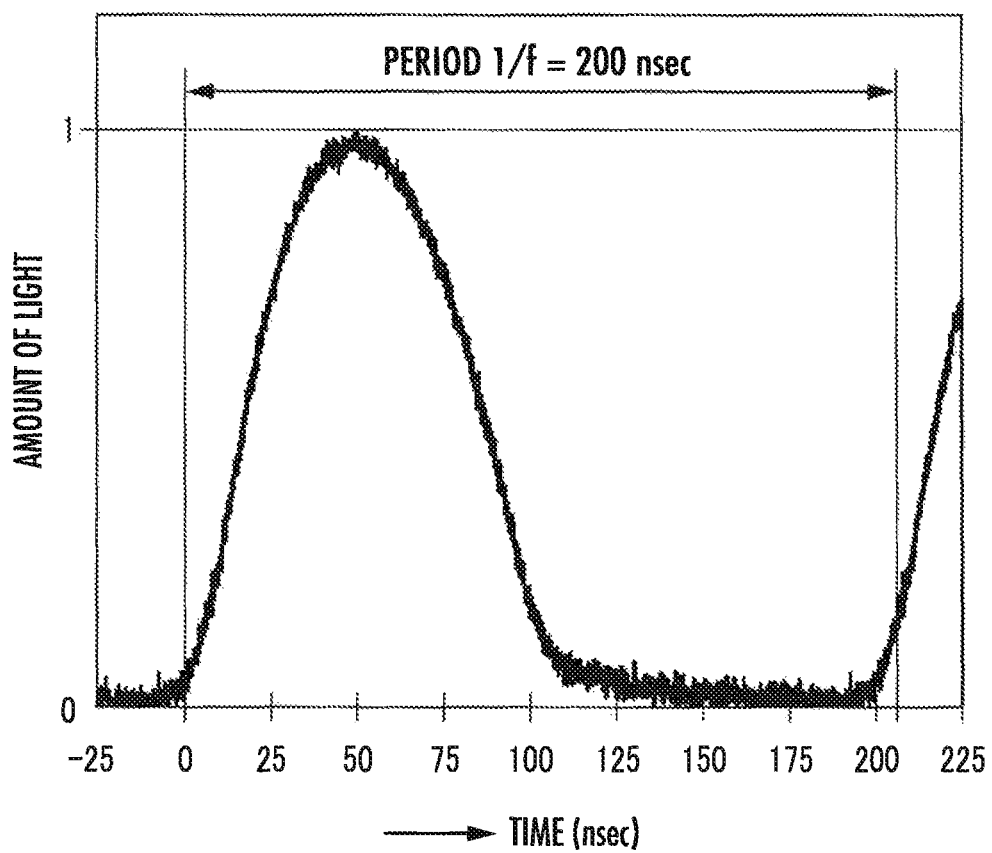
FIG. 17 is a graph illustrating the actual waveform of the signal light of a light source when the light source is driven by a light source control unit of a controller through a drive unit such that the intensity of the signal light of the light source exhibits the half-wave rectified waveform of the sine wave of FIG. 15A.

FIG. 17 illustrates the actual waveform of the signal light of the light source 2 when the light source control unit 51 of the controller 5 drives the light source 2 through the drive unit 57 such that the intensity of the signal light (=the emitting light La) of the light source 2 exhibits the half-wave rectified waveform of the sine wave of FIG. 15A and FIG. 15B.

Referring to FIG. 17, an LED, a laser light source or the like is selected as the light source 2. Further, the drive unit 57 generates the drive current to be supplied to the LED or the laser light source by FPGA pulse, FET or RLC.

The half-wave rectified waveform of FIG. 15A and FIG. 15B contains two discontinuous points of a tangent in each period. More specifically, in the half-wave rectified waveform of FIG. 15A and FIG. 15B, the half period of the first half is the half wave of the upper half part of the sine wave, and the half period of the latter half is flat. Thus, the tangent is discontinuous at the points of boundary between the half wave of the upper half part of the sine wave and the flat part.

However, in the actual light source 2 and the actual drive unit 57, it is difficult to form the waveform of the intensity of the emitting light La in the light source 2 into a waveform that contains places where the tangent is discontinuous. Even when a drive signal is output from the drive unit 57 to the light source 2 such that the emitting light La exhibits the intensity of the half-wave rectified waveform of FIG. 15A and FIG. 15B, the intensity of the emitting light La of the light source 2 inconveniently exhibits the periodic waveform in which the tangent continuously changes as illustrated in FIG. 17. However, even when the actual intensity of the emitting light La becomes as illustrated in FIG. 17, the incident intensity of the reflected light can be made substantially uniform independently of phase differences while securing the high incident intensity of the reflected light entering each pixel G from the distance measurement object 7, with less emission power of the light source 2.

Figure 18:
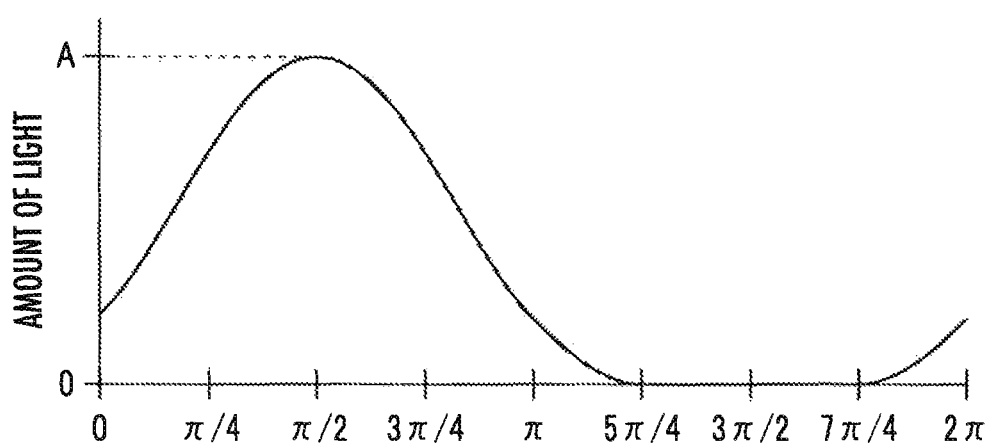
FIG. 18 is a chart illustrating the periodic waveform that replaces the half-wave rectified waveform of the sine wave as the periodic waveform of the intensity of the emitting light of the light source.

FIG. 18 illustrates a periodic waveform replacing the half-wave rectified waveform as the periodic waveform of the intensity of the emitting light La of the light source 2. The periodic waveform of FIG. 18 is equivalent to D (t) indicated by the foregoing expression 1 (hereinafter referred to as "the model waveform"). In the model waveform, the waveform part that contains the discontinuous points of the tangent in the half-wave rectified wave has been replaced by the waveform part in which the tangent continuously changes.

Figure 19:
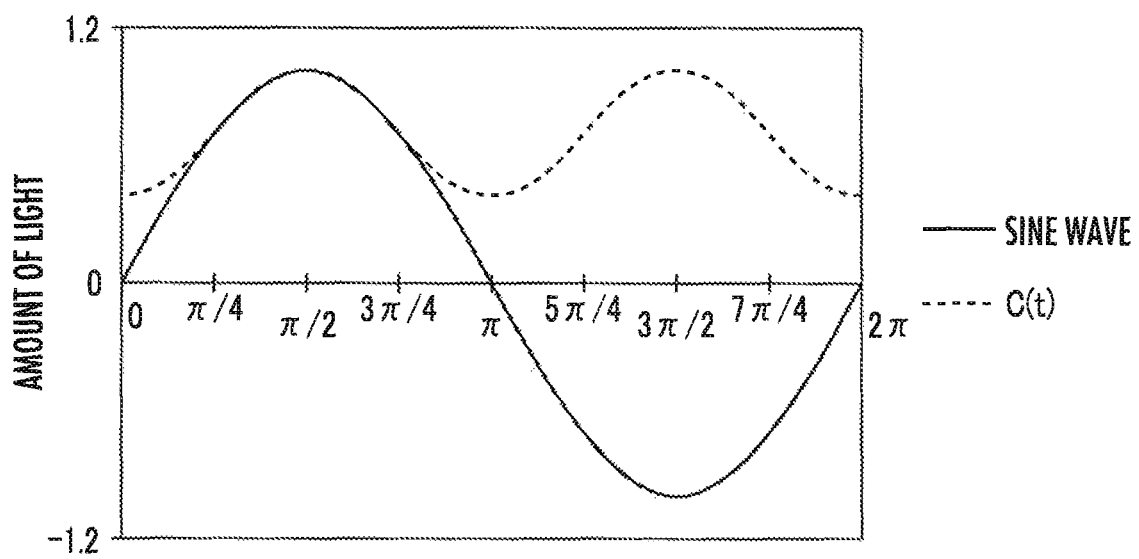
FIG. 19 is a chart illustrating two periodic waveforms before the periodic waveform in FIG. 18 is obtained.

FIG. 18 illustrates a periodic waveform that combines the two periodic waveforms of FIG. 19.

One (denoted by the solid line) of the two periodic waveforms of FIG. 19 indicates a sine wave in the case where A=1. The other (denoted by the dashed line) indicates C (t) defined by the following expressions in the case where A=1.

$C(t) = \sqrt{(2)} - |\cos(t)|$ where $2 \cdot \pi \cdot n \le t < \pi/4 + 2 \cdot \pi \cdot n, (3 \cdot \pi)/4 + 2 \cdot \pi \cdot n \le t < (5 \cdot \pi)/4 + 2 \cdot \pi \cdot n, (7 \cdot \pi)/4 + 2 \cdot \pi \cdot n \le t < (2 \cdot \pi) \cdot (n+1)$ (6.1):

$C(t) = |\sin(t)|$ where $\pi/4 + 2 \cdot \pi \cdot n \le t < (3 \cdot \pi)/4 + 2 \cdot \pi \cdot n, (5 \cdot \pi)/4 + 2 \cdot \pi \cdot n \le t < (7 \cdot \pi)/4 + 2 \cdot \pi \cdot n$ (6.2):

"$\sqrt{(2)}$" of (6.1) means that 2 is in the $\sqrt{}$.

Figure 20A:
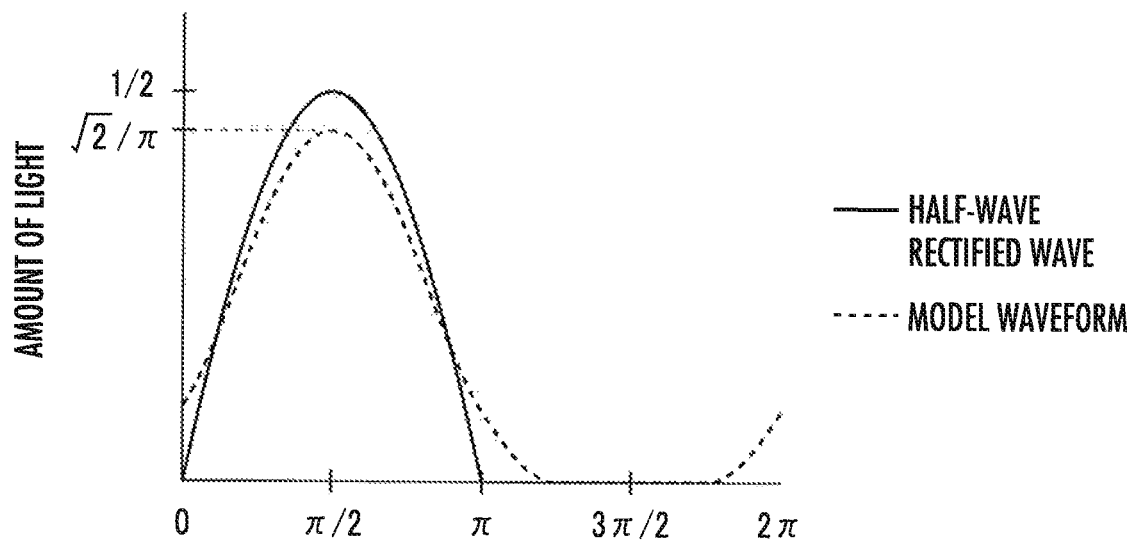
FIG. 20A is a graph illustrating the comparison between the reflected light of the half-wave rectified wave and the reflected light of a model waveform.
Figure 20B:
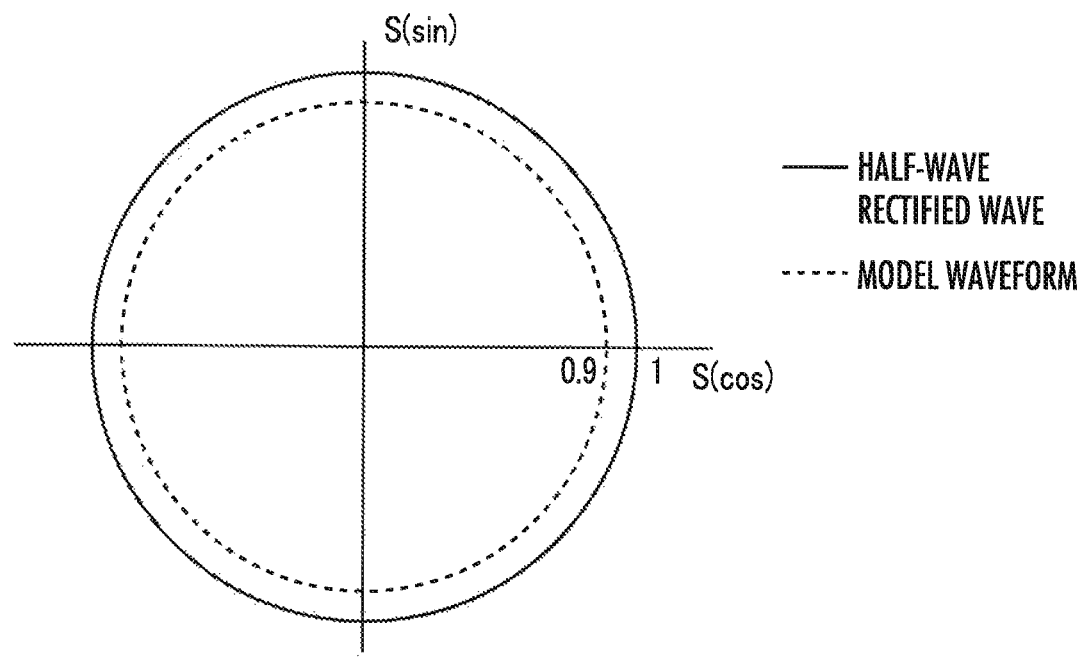
FIG. 20B is a luminance graph of each reflected light of FIG. 20A.

FIG. 20A and FIG. 20B relate to the comparison between the half-wave rectified wave and the model waveform. FIG. 20A is the graph of reflected light, and FIG. 20B is a reflected light luminance graph. In FIG. 20A and FIG. 20B, the "half-wave rectified wave" refers to the half-wave rectified wave of FIG. 15A and FIG. 15B. The "model waveform" means the reflected light having the waveform of FIG. 18. In FIG. 20, the half-wave rectified wave and the model waveform both have the integrated values of the light quantity (the incident intensity of the reflected light) per period thereof being set to one.

In the reflected light luminance graph of FIG. 20B, the reflected light luminance graph of the half-wave rectified wave is a circle having a radius of 1. In comparison, the reflected light luminance graph of the model waveform is a circle having a radius of approximately 0.9. Thus, although the emission power efficiency of the model waveform is lower than that of the half-wave rectified wave, the difference therebetween is small.

As described above, in the TOF range finder 1, the drive unit 57 drives the light source 2 so as to generate the incident light Lb based on the half-wave rectified wave or the model waveform. As a result, the emission power of the light source 2 can be saved, and the high incident intensity of reflected light can be secured. Further, the relationship between $\tan^{-1} \{S(\sin)/S(\cos)\}$ and the phase difference $\Delta\phi$ can be maintained to be a linear relationship.

It will be appreciated by persons skilled in the art that the disclosed technique is not limited to what has been particularly shown and described hereinabove. Rather the scope of the disclosed technique is defined only by the claims, which follow.

What is claimed is:

1. A TOF range finder comprising:
a light source which emits modulated light toward a distance measurement object in a predetermined imaging range, the modulated light having an intensity that exhibits a periodic waveform based on a half-wave rectified waveform;
an image sensor which has a plurality of pixels to detect, for each pixel, an incident intensity of incident light coming from the imaging range;
a phase difference detecting unit which detects a phase difference between emitting modulated light emitted from the light source and reflected modulated light, which is reflected off the distance measurement object in the imaging range of the image sensor and which enters a pixel of the image sensor, based on a quantity of charges stored in the image sensor; and
a distance calculating unit which calculates a distance to the distance measurement object based on the phase difference detected for each pixel by the phase difference detecting unit,
wherein the light source is an LED or a laser light source, and
wherein the periodic waveform is a waveform corresponding to D(t) given below:

$$D(t) = \frac{A}{2}(\sqrt{2} + \sin(t) - \cos(t)) \quad (0 \le t < \frac{\pi}{4}) \quad \text{[Expression 1]}$$
$$= A\sin(t) \quad (\frac{\pi}{4} \le t < \frac{3\pi}{4})$$
$$= \frac{A}{2}(\sqrt{2} + \sin(t) + \cos(t)) \quad (\frac{3\pi}{4} \le t < \pi)$$
$$= \frac{A}{2}(\sqrt{2} + \sin(t) + \cos(t)) \quad (\pi \le t < \frac{5\pi}{4})$$
$$= 0 \quad (\frac{5\pi}{4} \le t < \frac{7\pi}{4})$$
$$= \frac{A}{2}(\sqrt{2} + \sin(t) - \cos(t)) \quad (\frac{7\pi}{4} \le t < 2\pi)$$

where A denotes a constant and t denotes a phase angle in the above expression.

2. The TOF range finder according to claim 1, wherein the periodic waveform is a waveform in which a waveform part that contains a discontinuous point of a tangent in the half-wave rectified waveform has been replaced by a waveform part in which the tangent continuously changes.

3. The TOF range finder according to claim 1, wherein:
each pixel comprises:
two photodetectors which detect the incident intensity of the incident light; and
integration elements which integrate the outputs of the two photodetectors, the outputs being different by 90 degrees on the phase of the incident light of the pixel, and
the phase difference detecting unit detects the phase difference for each pixel based on the integration amounts of the integration elements of each pixel.

4. The TOF range finder according to claim 3, wherein:
the integration elements include two integration elements which integrate a photodetector of each pixel, the two integration elements integrating the output of the photodetector during one half time and the other half time of the period of the periodic waveform respectively, and
the phase difference detecting unit detects the phase difference based on the difference between the integration amounts of the two integration elements.

5. A TOF range finder comprising:
a light source which emits modulated light toward a distance measurement object in a predetermined imaging range, the modulated light having an intensity that exhibits a periodic waveform based on a half-wave rectified waveform;

an image sensor which has a plurality of pixels to detect, for each pixel, an incident intensity of incident light coming from the imaging range;

a phase difference detecting unit which detects a phase difference between emitting modulated light emitted from the light source and reflected modulated light, which is reflected off the distance measurement object in the imaging range of the image sensor and which enters a pixel of the image sensor, based on a quantity of charges stored in the image sensor; and a distance calculating unit which calculates a distance to the distance measurement object based on the phase difference detected for each pixel by the phase difference detecting unit, wherein the periodic waveform is a waveform in which a waveform part that contains a discontinuous point of a tangent in the half-wave rectified waveform has been replaced by a waveform part in which the tangent continuously changes.

6. The TOF range finder according to claim 5, wherein:
each pixel comprises:
- two photodetectors which detect the incident intensity of the incident light; and
- integration elements which integrate the outputs of the two photodetectors, the outputs being different by 90 degrees on the phase of the incident light of the pixel, and the phase difference detecting unit detects the phase difference for each pixel based on the integration amounts of the integration elements of each pixel.

7. The TOF range finder according to claim 6, wherein:
the integration elements include two integration elements which integrate a photodetector of each pixel, the two integration elements integrating the output of the photodetector during one half time and the other half time of the period of the periodic waveform respectively, and the phase difference detecting unit detects the phase difference based on the difference between the integration amounts of the two integration elements.

* * * * *